United States Patent
Yan et al.

(10) Patent No.: US 11,131,999 B2
(45) Date of Patent: Sep. 28, 2021

(54) METHOD AND APPARATUS FOR IDENTIFYING LASER POINT CLOUD DATA OF AUTONOMOUS VEHICLE

(71) Applicant: Baidu Online Network Technology (Beijing) Co., Ltd., Beijing (CN)

(72) Inventors: Feilong Yan, Beijing (CN); He Yan, Beijing (CN); Liang Wang, Beijing (CN); Bosheng Wang, Beijing (CN); Shiyu Song, Beijing (CN); Weixin Lu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 601 days.

(21) Appl. No.: 16/026,338

(22) Filed: Jul. 3, 2018

(65) Prior Publication Data
US 2019/0011566 A1    Jan. 10, 2019

(30) Foreign Application Priority Data
Jul. 4, 2017    (CN) .......................... 201710539630.X

(51) Int. Cl.
*G01C 3/08*    (2006.01)
*G05D 1/02*    (2020.01)
(Continued)

(52) U.S. Cl.
CPC .............. *G05D 1/024* (2013.01); *G01S 17/86* (2020.01); *G01S 17/89* (2013.01); *G01S 17/931* (2020.01);
(Continued)

(58) Field of Classification Search
CPC ........ G01S 17/89; G01S 17/86; G01S 17/931; G01S 17/894; G05D 1/0274; G05D 1/024;
(Continued)

(56) References Cited

U.S. PATENT DOCUMENTS 9,286,538 B1    3/2016    Chen
9,523,772 B2    12/2016    Rogan
(Continued)

FOREIGN PATENT DOCUMENTS

CN    102779280 A    11/2012
CN    106133756 A    11/2016
(Continued)

*Primary Examiner* — Mark Hellner
(74) *Attorney, Agent, or Firm* — Nixon Peabody LLP

(57) ABSTRACT

A method and apparatus for identifying laser point cloud data of an autonomous vehicle provided with a lidar. A specific implementation of the method includes: acquiring current pose information of the autonomous vehicle in a world coordinate system in response to receiving a latest frame of laser point cloud data collected by the lidar; acquiring from the cache, based on the current pose information, N×N map blocks centered on map blocks corresponding to the current pose information in a preset three-dimensional grid map and pre-loaded into a cache and are; and executing, for each laser point data in the received laser point cloud data, the laser point data identification operations. The implementation realizes identifying whether each laser point data is a static laser point, and can improve the accuracy rate of identifying a laser point data obstacle.

20 Claims, 8 Drawing Sheets

(51) Int. Cl.
  *G01S 17/89*     (2020.01)
  *G06T 7/73*      (2017.01)
  *G05D 1/00*      (2006.01)
  *G06K 9/00*      (2006.01)
  *G06T 7/70*      (2017.01)
  *G01S 17/931*    (2020.01)
  *G01S 17/86*     (2020.01)

(52) U.S. Cl.
  CPC ......... *G05D 1/0088* (2013.01); *G05D 1/0274* (2013.01); *G06K 9/00791* (2013.01); *G06K 9/00805* (2013.01); *G06T 7/70* (2017.01); *G06T 7/73* (2017.01); *G05D 2201/0213* (2013.01); *G06T 2207/10028* (2013.01); *G06T 2207/10052* (2013.01); *G06T 2207/20021* (2013.01); *G06T 2207/30261* (2013.01)

(58) Field of Classification Search
  CPC ....... G05D 1/0088; G05D 2201/10052; G05D 2201/0213; G06K 9/00805; G06K 9/00791; G06T 7/70; G06T 7/73; G06T 2207/10028; G06T 2207/10052; G06T 2207/30261; G06T 2207/20021; B60W 2720/406; B60W 2754/00; B60W 10/00; B60W 2900/00; B60W 60/00276; B60W 2300/00; B60W 2350/231; B60W 2540/41; B60W 2540/049; B60W 2556/65; B60W 2710/00
  See application file for complete search history.

(56) References Cited

U.S. PATENT DOCUMENTS 9,633,483 B1    4/2017  Xu
10,444,759 B2 * 10/2019  Douillard ................ G06T 17/05

FOREIGN PATENT DOCUMENTS

EP    WO2017/021781 A1 *  9/2017
EP        3332216 B1 *  6/2018  ............. G01S 17/89

* cited by examiner

METHOD AND APPARATUS FOR IDENTIFYING LASER POINT CLOUD DATA OF AUTONOMOUS VEHICLE

CROSS-REFERENCE TO RELATED APPLICATIONS

This application claims priority to Chinese Patent Application No. 201710539630.X, filed with the State Intellectual Property Office of the People's Republic of China (SIPO) on Jul. 4, 2017, the content of which is incorporated herein by reference in its entirety.

TECHNICAL FIELD

The present disclosure relates to the field of autonomous vehicles, specifically relates to the field of obstacle identification, and particularly discloses a method and apparatus for identifying laser point cloud data of an autonomous vehicle.

BACKGROUND

At present, most autonomous vehicles are equipped with lidars. An autonomous vehicle analyzes laser point cloud data collected by the lidar to ultimately plan a route and control the driving. When analyzing the laser point cloud, the most important task is to carry out obstacle identification for each laser point data in the laser point cloud data, that is, to determine what kind of the obstacle in the physical world characterized by each laser point data in the laser point cloud data is. The existing obstacle identification methods for laser point data are mainly rule-based methods or machine learning-based methods.

However, the rule-based method has the problems that it is difficult to find and use suitable rules, and it is too difficult to identify all types of obstacles in the real world. In addition, the machine learning-based method may not be able to identify the types of obstacles that have not been trained.

SUMMARY

The object of the present disclosure is to provide an improved method and apparatus for identifying laser point cloud data of an autonomous vehicle to solve the technical problems mentioned in the above background section.

In a first aspect, the embodiments of the present disclosure provide a method for identifying laser point cloud data of an autonomous vehicle provided with a lidar, and the method includes: acquiring current pose information of the autonomous vehicle in a world coordinate system in response to receiving a latest frame of laser point cloud data collected by the lidar; acquiring from a cache, based on the current pose information, N×N map blocks centered on a map block corresponding to the current pose information in a preset three-dimensional grid map and pre-loaded into the cache, N being an odd number, the preset three-dimensional grid map dividing an earth surface into R rows and C columns of square map blocks according to the world coordinate system, each map block divided into M×M square map grids, each map grid comprising at least one grid cube, and each grid cube comprising a cube type indicating the grid cube being a static cube characterizing a static obstacle or a dynamic cube characterizing a dynamic obstacle; and executing, for each laser point data in the received laser point cloud data, following laser point data identification operations: determining coordinate of the laser point data in the world coordinate system based on the current pose information; acquiring, from the acquired N×N map blocks, a grid cube corresponding to the coordinate of the laser point data in the world coordinate system; and defining the laser point data as static laser point data characterizing a static obstacle in response to the cube type of the acquired grid cube being a static cube.

In some embodiments, the laser point data identification operations further include: defining the laser point data as dynamic laser point data characterizing a dynamic obstacle in response to the cube type of the acquired grid cube being a dynamic cube.

In some embodiments, before the acquiring current pose information of the autonomous vehicle in a world coordinate system in response to receiving a latest frame of the laser point cloud data collected by the lidar, the method further comprising: acquiring the pose information of the autonomous vehicle in the world coordinate system in response to detecting a start signal of the autonomous vehicle, and define the acquired pose information as pose information at start time; defining a map block corresponding to the pose information at the start time in the preset three-dimensional grid map as an initial map block; loading the N×N map blocks in the preset three-dimensional grid map and centered on the initial map block from a magnetic disk into the cache; and initializing and executing a first pre-loaded thread, wherein the first pre-loaded thread is used for loading (4N+4) map blocks not loaded in the cache, in (N+2)×(N+2) map blocks centered on the initial map block in the preset three-dimensional grid map, into the cache from the magnetic disk.

In some embodiments, before the executing, for each laser point data in the received laser point cloud data, following laser point data identification operations, the method further comprising: defining the pose information of the autonomous vehicle in a previous sampling period before current time as pose information of a previous period; determining a driving direction of the autonomous vehicle based on a difference between the current pose information and the pose information of the previous period; and initializing and executing a second pre-loaded thread, wherein the second pre-loaded thread is used for loading (N+2) map blocks adjacent to the (N+2)×(N+2) map blocks along the determined driving direction in the preset three-dimensional grid map into the cache from the magnetic disk, the (N+2)×(N+2) map blocks centered on a map block corresponding to the current pose information and loaded into the cache.

In some embodiments, the grid cube further comprises a center coordinate of the grid cube in the world coordinate system; and after the acquiring current pose information of the autonomous vehicle in the world coordinate system, the method further comprises: defining the current pose information as an initial value of to-be-determined vehicle pose information; constructing a target function by: taking the to-be-determined vehicle pose information as an independent variable; for each piece of laser point data in the laser point cloud data, executing following alignment distance determination operations: calculating a coordinate of the laser point data in the world coordinate system based on the to-be-determined vehicle pose information; defining a center coordinate of a grid cube among grid cubes of each map grid in each map block loaded in the cache, the grid cube having a center coordinate closest to the coordinate of the laser point data in the world coordinate system, as an alignment coordinate of the laser point data in the world coordinate system; defining a distance between the coordinate of the laser point data in the world coordinate system and the alignment coordinate of the laser point data in the world coordinate system as an alignment distance of the laser point data; calculating a sum of the alignment distances of all laser point data in the laser point cloud data; and defining the calculated sum of the alignment distances as an output of the target function; determining to-be-determined pose information causing a minimum output of the target function by using an iterative closest point algorithm; and updating the current pose information with the determined to-be-determined pose information.

In some embodiments, the for each laser point data in the laser point cloud data, executing following alignment distance determination operations comprises: down-sampling the laser point cloud data to obtain down-sampled laser point cloud data; executing the alignment distance determination operations for each laser point data in the down-sampled laser point cloud data; and the calculating a sum of the alignment distances of all laser point data in the laser point cloud data, comprising: calculating a sum of the alignment distances of all laser point data in the down-sampled laser point cloud data.

In some embodiments, the defining a center coordinate of a grid cube among grid cubes of each map grid of each map block loaded in the cache, the grid cube having a center coordinate closest to the coordinate of the laser point data in the world coordinate system, as an alignment coordinate of the laser point data in the world coordinate system comprises: determining, in the grid cubes of the each map grid of the each map block loaded in the cache, at least one grid cube having a distance between the center coordinate and the coordinate of the laser point data in the world coordinate system being less than or equal to a preset distance threshold; and defining the center coordinate of the grid cube having the center coordinate closest to the coordinate of the laser point data in the world coordinate system in the determined at least one grid cube as an alignment coordinate of the laser point data in the world coordinate system.

In some embodiments, the preset three-dimensional grid map is obtained by: acquiring a laser point cloud data frame sequence collected by a map collecting vehicle, each frame of laser point cloud data in the laser point cloud data frame sequence being marked with corresponding current vehicle pose information; for the each frame of the laser point cloud data in the laser point cloud data frame sequence, converting each piece of laser point data in the frame of the laser point cloud data into a coordinate in the world coordinate system based on the current vehicle pose information corresponding to the marked frame of the laser point cloud data to obtain a converted laser point cloud frame sequence; splicing the each frame of the laser point cloud data in the converted laser point cloud data frame sequence to obtain spliced laser point cloud data, generating a three-dimensional map based on the spliced laser point cloud data, and presenting the three-dimensional map; in response to receiving a dynamic laser point labeling operation of a user on the three-dimensional map, acquiring a dynamic laser point labeled by the user, and deleting the acquired dynamic laser point from the spliced laser point cloud data to obtain static laser point cloud data; generating a preset three-dimensional grid map by: dividing an earth surface into R rows and C columns of square map blocks in the world coordinate system, dividing each map block into M×M square map grids, dividing each map grid into at least one grid cube with an edge length of each grid cube being the same as a side length of each map grid, and setting the cube type of each grid cube as a dynamic cube; and for each piece of static laser point data in the static laser point cloud data, setting the cube type of the grid cube corresponding to the coordinate of the static laser point data in the world coordinate system as the static cube in the preset three-dimensional grid map.

In a second aspect, the embodiments of the present disclosure provide an apparatus for identifying laser point cloud data of an autonomous vehicle provided with a lidar, and the apparatus includes: a first acquiring unit, for acquiring current pose information of the autonomous vehicle in a world coordinate system in response to receiving a latest frame of laser point cloud data collected by the lidar; a second acquiring unit, for acquiring from a cache, based on the current pose information, N×N map blocks centered on a map block corresponding to the current pose information in a preset three-dimensional grid map and pre-loaded into the cache, N being an odd number, the preset three-dimensional grid map dividing an earth surface into R rows and C columns of square map blocks according to the world coordinate system, each map block divided into M×M square map grids, each map grid comprising at least one grid cube, and each grid cube comprising a cube type indicating the grid cube being a static cube characterizing a static obstacle or a dynamic cube characterizing a dynamic obstacle; and an identifying unit, for executing, for each laser point data in the received laser point cloud data, following laser point data identification operations: determining coordinate of the laser point data in the world coordinate system based on the current pose information; acquiring, from the acquired N×N map blocks, a grid cube corresponding to the coordinate of the laser point data in the world coordinate system; and defining the laser point data as static laser point data characterizing a static obstacle in response to the cube type of the acquired grid cube being a static cube.

In some embodiments, the laser point data identification operations further comprise: defining the laser point data as dynamic laser point data characterizing a dynamic obstacle in response to the cube type of the acquired grid cube being a dynamic cube.

In some embodiments, the apparatus further includes: a first determining unit, for acquiring the pose information of the autonomous vehicle in the world coordinate system in response to detecting a start signal of the autonomous vehicle, and defining the acquired pose information as pose information at start time; a second determining unit, for defining a map block corresponding to the pose information at the start time in the preset three-dimensional grid map as an initial map block; a loading unit, for loading the N×N map blocks in the preset three-dimensional grid map and centered on the initial map block from a magnetic disk into the cache; and a first pre-loading unit, for initializing and executing a first pre-loaded thread, wherein the first pre-loaded thread is used for loading (4N+4) map blocks not loaded in the cache, in (N+2)×(N+2) map blocks centered on the initial map block in the preset three-dimensional grid map, into the cache from the magnetic disk.

In some embodiments, the apparatus further includes: a third determining unit, for defining the pose information of the autonomous vehicle in a previous sampling period before current time as pose information of a previous period; a fourth determining unit, for determining a driving direction of the autonomous vehicle based on a difference between the current pose information and the pose information of the previous period; and a second pre-loading unit, for initializing and executing a second pre-loaded thread, wherein the second pre-loaded thread is used for loading (N+2) map blocks adjacent to the (N+2)×(N+2) map blocks along the determined driving direction in the preset three-dimensional grid map into the cache from the magnetic disk, the (N+2)×(N+2) map blocks centered on a map block corresponding to the current pose information and loaded into the cache.

In some embodiments, the grid cube further comprises a center coordinate of the grid cube in the world coordinate system; and the apparatus further comprises: a fifth determining unit, for defining the current pose information as an initial value of to-be-determined vehicle pose information; a constructing unit, for constructing a target function by: taking the to-be-determined vehicle pose information as an independent variable; for each piece of laser point data in the laser point cloud data, executing following alignment distance determination operations: calculating a coordinate of the laser point data in the world coordinate system based on the to-be-determined vehicle pose information; defining a center coordinate of a grid cube among grid cubes of each map grid in each map block loaded in the cache, the grid cube having a center coordinate closest to the coordinate of the laser point data in the world coordinate system, as an alignment coordinate of the laser point data in the world coordinate system; defining a distance between the coordinate of the laser point data in the world coordinate system and the alignment coordinate of the laser point data in the world coordinate system as an alignment distance of the laser point data; calculating a sum of the alignment distances of all laser point data in the laser point cloud data; and defining the calculated sum of the alignment distances as an output of the target function; a sixth determining unit, for determining to-be-determined pose information causing a minimum output of the target function by using an iterative closest point algorithm; and an updating unit, for updating the current pose information with the determined to-be-determined pose information.

In some embodiments, the for each laser point data in the laser point cloud data, executing following alignment distance determination operations comprises: down-sampling the laser point cloud data to obtain down-sampled laser point cloud data; executing the alignment distance determination operations for each laser point data in the down-sampled laser point cloud data; and the calculating a sum of the alignment distances of all laser point data in the laser point cloud data, comprising: calculating a sum of the alignment distances of all laser point data in the down-sampled laser point cloud data.

In some embodiments, the defining a center coordinate of a grid cube among grid cubes of each map grid of each map block loaded in the cache, the grid cube having a center coordinate closest to the coordinate of the laser point data in the world coordinate system, as an alignment coordinate of the laser point data in the world coordinate system comprises: determining, in the grid cubes of the each map grid of the each map block loaded in the cache, at least one grid cube having a distance between the center coordinate and the coordinate of the laser point data in the world coordinate system being less than or equal to a preset distance threshold; and defining the center coordinate of the grid cube having the center coordinate closest to the coordinate of the laser point data in the world coordinate system in the determined at least one grid cube as an alignment coordinate of the laser point data in the world coordinate system.

In some embodiments, the preset three-dimensional grid map is obtained by: acquiring a laser point cloud data frame sequence collected by a map collecting vehicle, each frame of laser point cloud data in the laser point cloud data frame sequence being marked with corresponding current vehicle pose information; for the each frame of the laser point cloud data in the laser point cloud data frame sequence, converting each piece of laser point data in the frame of the laser point cloud data into a coordinate in the world coordinate system based on the current vehicle pose information corresponding to the marked frame of the laser point cloud data to obtain a converted laser point cloud frame sequence; splicing the each frame of the laser point cloud data in the converted laser point cloud data frame sequence to obtain spliced laser point cloud data, generating a three-dimensional map based on the spliced laser point cloud data, and presenting the three-dimensional map; in response to receiving a dynamic laser point labeling operation of a user on the three-dimensional map, acquiring a dynamic laser point labeled by the user, and deleting the acquired dynamic laser point from the spliced laser point cloud data to obtain static laser point cloud data; generating a preset three-dimensional grid map by: dividing an earth surface into R rows and C columns of square map blocks in the world coordinate system, dividing each map block into M×M square map grids, dividing each map grid into at least one grid cube with an edge length of each grid cube being the same as a side length of each map grid, and setting the cube type of each grid cube as a dynamic cube; and for each piece of static laser point data in the static laser point cloud data, setting the cube type of the grid cube corresponding to the coordinate of the static laser point data in the world coordinate system as the static cube in the preset three-dimensional grid map.

In a third aspect, the embodiments of the present disclosure provide a driving control device including: one or more processors, and a storage device for storing one or more programs, and when the one or more programs are executed by the one or more processors, cause the one or more processors to implement the method described in any implementation in the first aspect.

In a fourth aspect, the embodiments of the present disclosure provide a computer readable storage medium on which computer programs are stored, and when the computer programs are executed by the processors, the method as described in any implementation in the first aspect is implemented.

According to the method and apparatus for identifying laser point cloud data of an autonomous vehicle, provided by the embodiments of the present disclosure, by acquiring current pose information of the autonomous vehicle in a world coordinate system when a latest frame of laser point cloud data collected by the lidar is received, acquiring from a cache, based on the current pose information, N×N map blocks centered on a map block corresponding to the current pose information in a preset three-dimensional grid map and pre-loaded into the cache, and for each laser point data in the received laser point cloud data, executing laser point data identification operations, thereby whether each laser point data is a static laser point can be identified, providing basis for subsequent analysis and processing of the laser point data by the autonomous vehicle, and thus improving the accuracy of laser point data obstacle identification.

BRIEF DESCRIPTION OF THE DRAWINGS

Other features, objects and advantages of the present application will become more apparent by reading a detailed description of the nonrestrictive embodiments made with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
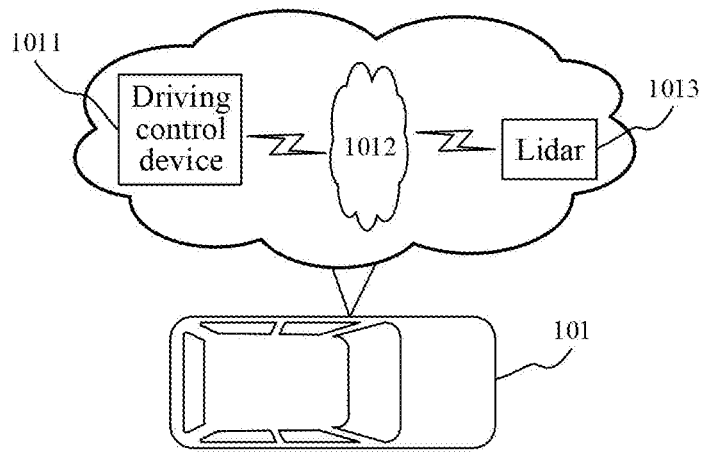
FIG. 1 is an architectural diagram of an exemplary system in which the present disclosure can be applied.

FIG. 1 shows an exemplary system architecture of a system 100 in which a method for identifying laser point cloud data of an autonomous vehicle or the apparatus for identifying laser point cloud data of an autonomous vehicle according to the embodiments of the present disclosure.

As shown in FIG. 1, the system architecture 100 may include an autonomous vehicle 101.

The autonomous vehicle 101 is equipped with a driving control device 1011, a network 1012, and a lidar 1013. The network 1012 serves as a medium providing a communication link between the driving control device 1011 and the lidar 1013. The network 1012 may include various connection types, such as wired and wireless communication links, or optical fiber cables.

The driving control device (also known as an on-board controller) 1011 may be responsible for overall intelligent control of the autonomous vehicle 101. The driving control device 1011 may be a stand-alone controller, such as a programmable logic controller (PLC), a microcontroller, or an industrial control machine, it may also be another equipment having I/O ports and composed of electronic components with a computing and controlling function, and it may also be a computer device including an installed vehicle driving control application.

It should be noted that in practice, the autonomous vehicle 101 may also be equipped with at least one sensor, such as a camera, a gravity sensor, and a wheel speed sensor. In some cases, the autonomous vehicle 101 may also be equipped with global navigation satellite system (GNSS) equipment and a strap-down inertial navigation system (SINS), etc.

It should be noted that the method for identifying laser point cloud data of an autonomous vehicle, provided by the embodiments of the present disclosure, is generally executed by the driving control device 1011, and accordingly, the apparatus for identifying laser point cloud data of an autonomous vehicle is generally arranged in the driving control device 1011.

It should be appreciated that the numbers of the driving control device, the network, and the lidar in FIG. 1 are only illustrative. Any number of terminal devices, networks and servers may be provided based on the actual requirements.

Figure 2:
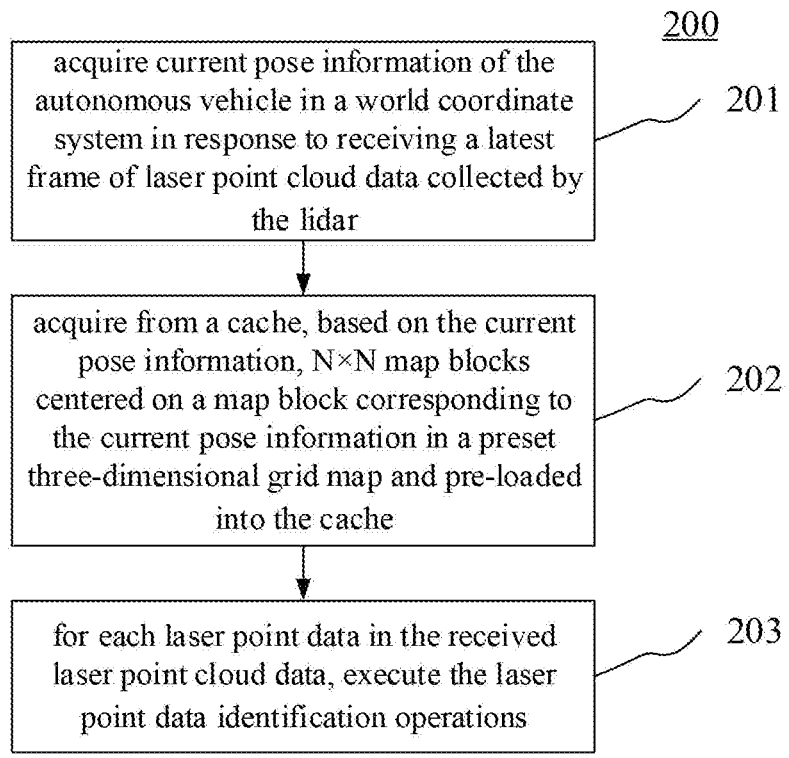
FIG. 2 shows a flow chart of the method for identifying laser point cloud data of an autonomous vehicle according to an embodiment of the present disclosure.

Continue to refer to FIG. 2, it shows a flow 200 of the method for identifying laser point cloud data of an autonomous vehicle according to an embodiment of the present disclosure. The method for identifying laser point cloud data of an autonomous vehicle includes:

Step 201, acquiring current pose information of the autonomous vehicle in a world coordinate system in response to receiving a latest frame of laser point cloud data collected by the lidar.

In the present embodiment, an electronic device (e.g., the driving control device shown in FIG. 1) on which the method for identifying laser point cloud data of an autonomous vehicle runs can acquire the current pose information of the autonomous vehicle in the world coordinate system in real time after receiving the latest frame of laser point cloud data collected by the lidar.

Here, one frame of laser point cloud data collected by the lidar can be laser point cloud data collected by a laser transmitter arranged in the lidar during the laser transmitter rotating about the central axis of the lidar for one round. The laser point cloud data may include at least one laser point data, the laser point data may include three-dimensional coordinates, and the three-dimensional coordinates in the laser point data may be three-dimensional coordinates of a target scanned by a laser point relative to a vehicle body coordinate system of the autonomous vehicle. The vehicle body coordinate system of the autonomous vehicle may be a predefined coordinate system. As an example, the center point of the lidar can be taken as the coordinate origin of the vehicle body coordinate system of the autonomous vehicle, with an X axis pointing from the coordinate origin to a vehicle head, a Y axis pointing from the coordinate origin to the right of the vehicle body, and a Z axis perpendicular to the X axis and pointing to the upward side of the vehicle.

The lidar can output the collected frame of laser point cloud data each time the laser transmitter scans while rotating about the central axis for one round. Thus, the electronic device can acquire the current pose information of the autonomous vehicle in the world coordinate system each time a new frame of laser point cloud data are received.

Here, the electronic device can acquire the current pose information of the autonomous vehicle in the world coordinate system through a hardware structure installed on the autonomous vehicle and capable of providing a positioning function. Here, the current pose information of the autonomous vehicle in the world coordinate system may include location information and posture information, the location information may include three-dimensional coordinates (e.g., latitude and longitude, and height), and the posture information may include a pitch angle, a yaw angle, or a roll angle.

As an example, a GNSS device and an inertial navigation system may be installed in the autonomous vehicle, and the electronic device can acquire three-dimensional coordinates of the autonomous vehicle in the world coordinate system from the GNSS device, can acquire a pitch angle, a yaw angle, or a roll angle of the autonomous vehicle in the world coordinate system from the inertial navigation system, and takes the acquired three-dimensional coordinates as the location information in the current pose information, and the acquired pitch angle, the yaw angle, and the roll angle as posture information in the current pose information.

Step 202, acquiring from a cache, based on the current pose information, N×N map blocks centered on a map block corresponding to the current pose information in a preset three-dimensional grid map and pre-loaded into the cache.

In the present embodiment, based on the current pose information obtained in step 201, the electronic device (e.g., the driving control device shown in FIG. 1) can first determine the map blocks corresponding to the current pose information in the preset three-dimensional grid map according to the current pose information.

Here, the preset three-dimensional grid map can divide the earth surface into R rows and C columns of square map blocks according to the world coordinate system (for example, an UTM (Universal Transverse Mercator) word coordinate system), each map block can be divided into M×M square map grids, and each map grid may include at least one grid cube; and the edge length of the grid cube here can be the same as the side length of the map grid, and each grid cube may include a cube type indicating that the grid cube is a static cube characterizing a static obstacle or is a dynamic cube characterizing a dynamic obstacle. Here, R, C and M are positive integers.

The preset three-dimensional grid map can be pre-stored in a magnetic disk of the electronic device and pre-loaded into a cache by the electronic device when needed.

In some optional implementations of the present embodiment, the preset three-dimensional grid map may be a three-dimensional grid map provided by a map provider and meeting the above requirements.

In some optional implementations of the present embodiment, the preset three-dimensional grid map may also be obtained by:

Step 1, acquiring a laser point cloud data frame sequence collected by a map collecting vehicle.

Here, each frame of laser point cloud data in the acquired laser point cloud data frame sequence is marked with corresponding vehicle current pose information. The map collecting vehicle can be provided with a lidar, so that when the map collecting vehicle passes through a geographic location of a to-be-generated map area, the laser point cloud data of the to-be-generated map area can be collected, and the pose information of the vehicle corresponding to each frame of laser point cloud data in the world coordinate system can be recorded in the process of collecting the laser point cloud data.

Step 2, for each frame of laser point cloud data in the laser point cloud data frame sequence, converting each piece of laser point data in the frame of laser point cloud data into a coordinate in the world coordinate system based on the vehicle current pose information corresponding to the marked frame of laser point cloud data to obtain a converted laser point cloud frame sequence.

Step 3, splicing the each frame of the laser point cloud data in the converted laser point cloud data frame sequence to obtain spliced laser point cloud data, generating a three-dimensional map based on the spliced laser point cloud data, and presenting the three-dimensional map.

Step 4, in response to receiving a dynamic laser point labeling operation of a user on the three-dimensional map, acquiring a dynamic laser point labeled by the user, and deleting the acquired dynamic laser point from the spliced laser point cloud data to obtain static laser point cloud data.

Here, a dynamic laser point labeling operation of the user on the three-dimensional map can be various types of operations that can determine which laser points are dynamic laser points. As an example, the user can use a three-dimensional bounding box to enclose the laser point data and determine the laser point data in the three-dimensional bounding box as dynamic laser point data.

Since the dynamic laser point data in the spliced laser point cloud data has been deleted, all the data left in the spliced laser point cloud data are static laser point data.

Step 5, generating a preset three-dimensional grid map by: dividing an earth surface into R rows and C columns of square map blocks in the world coordinate system, dividing each map block into M×M square map grids, dividing each map grid into at least one grid cube with an edge length of each grid cube being the same as a side length of each map grid, and setting the cube type of each grid cube as a dynamic cube.

Step 6, for each piece of static laser point data in the static laser point cloud data, setting the cube type of the grid cube corresponding to the coordinate of the static laser point data in the world coordinate system as the static cube in the preset three-dimensional grid map.

In the present embodiment, since the preset three-dimensional grid map is based on the world coordinate system and the current pose information acquired in step 201 is also based on the world coordinate system, the electronic device can determine which map block the coordinates of the autonomous vehicle in the world coordinate system are in according to the location information (i.e., the coordinates of the autonomous vehicle in the world coordinate system) in the current pose information, the coordinates of the upper left corner of the three-dimensional grid map, and the preset side length of a map block of the three-dimensional grid map, i.e., determine the map block corresponding to the current pose information in the preset three-dimensional grid map.

As an example, the map block can be distinguished by (i, j), wherein i can represent a row number of the map block in the preset three-dimensional grid map, and j can represent a column number of the map block in the preset three-dimensional grid map.

Then, the electronic device can acquire N×N map blocks which are pre-loaded into the cache and are centered on the determined map blocks corresponding to the current pose information in the preset three-dimensional grid map from the cache. N is an odd number.

Figure 3:
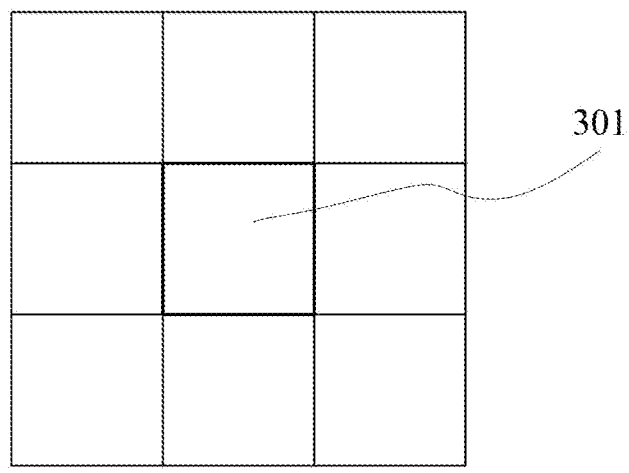
FIG. 3 is a schematic diagram of 3×3 map blocks centered on map blocks corresponding to current pose information according to the present disclosure.

As an example, if the map block corresponding to the current pose information can be represented as (i, j), wherein i represents the row number of the map block corresponding to the current pose information in the preset three-dimensional grid map, and j represents the column number of the map block corresponding to the current pose information in the preset three-dimensional grid map, the 3×3 map blocks centered on the map block corresponding to the current pose information can be respectively represented as follows: (i−1, j−1), (i, j−1), (i+1, j−1), (i−1, j), (i, j), (i+1, j), (i−1, j+1), (i, j+1), and (i+1, j+1). Referring to FIG. 3, FIG. 3 shows the 3×3 map blocks centered on the map block corresponding to the current pose information when N is 3, wherein the map block shown by reference numeral 301 is a map block corresponding to the current pose information.

Step 203, executing, for each laser point data in the received laser point cloud data, laser point data identification operations.

In the present embodiment, the electronic device (e.g., the driving control device shown in FIG. 1) on which the method for identifying laser point cloud data of an autonomous vehicle runs can execute the following laser point data identification operations for each laser point data in the latest frame of laser point cloud data received in step 201:

First, the coordinates of the laser point data in the world coordinate system can be determined according to the current pose information. Here, since three-dimensional coordinates in the laser point cloud data collected by the lidar are coordinates of a target scanned by laser points emitted by the lidar relative to a vehicle body coordinate system, and the current pose information is based on the coordinates of the world coordinate system, the electronic device can obtain a translation matrix according to the location information in the current pose information and obtain a rotation matrix according to the posture information in the current pose information. Then, the three-dimensional coordinates in the laser point data can be converted according to the rotation matrix and translation matrix to obtain the coordinates of the laser point data in the world coordinate system. It should be noted that how to obtain the translation matrix according to the location information in the current pose information, how to obtain the rotation matrix according to the posture information in the current pose information, and how to convert the three-dimensional coordinates in the laser point data according to the rotation matrix and the translation matrix to obtain the coordinates of the laser point data in the world coordinate system are existing technologies that are widely researched and applied at present and will not be described here.

Then, grid cubes corresponding to the coordinates of the laser point data in the world coordinate system can be acquired from the N×N map blocks acquired in step 202. Here, since the N×N map blocks acquired from the cache in step 202 are centered on the map blocks corresponding to the current pose information, and the scanning range of the lidar is limited due to the limitation of hardware parameters, the electronic device can set the value of N according to the scanning range of the lidar, the value of the number M of map grids in each map block in the preset three-dimensional grid map, and side lengths of the map grids, thus ensuring that the acquired N×N map blocks centered on the map blocks corresponding to the current pose information can cover the scanning range of the lidar. For example, each map block in the preset three-dimensional grid map includes 512×512 map grids, and the side length of each map grid is 0.125 meters, then the size of each map block is 64 meters× 64 meters, and if the scanning range of the lidar is less than 64 meters, then N can be 3; if the scanning range of the lidar is more than 64 meters and less than 128 meters, N may be 5.

Since the acquired N×N map blocks centered on the map blocks corresponding to the current pose information can cover the scanning range of the lidar, and the laser point data is acquired by the lidar, the grid cube corresponding to the coordinates of the laser point data in the world coordinate system is inevitably in the acquired N×N map blocks. Thus, the electronic device can determine in which grid cube the coordinates of the laser point data in the world coordinate system are according to the coordinates of the laser point data in the world coordinate system, the coordinates of the upper left corner of the preset three-dimensional grid map, the side length of the map block of the preset three-dimensional grid map, the number of the map grids included in the map block, and the side length of the map grid, i.e., the grid cube corresponding to the coordinates of the laser point data in the world coordinate system is determined. As an example, the grid cube can be distinguished by (i, j, k, l, m), wherein i can represent that the grid cube is in which row of map blocks in the preset three-dimensional grid map, j can represent that the grid cube is in which column of map blocks in the preset three-dimensional grid map, k can represent that the grid cube is in which row of map grids of the map block where the grid cube is located, l can represent that the grid cube is in which column of map grids of the map block where the grid cube is located, and m can represent that the grid cube is in which grid cube of the grid where the grid cube is located. i, j, k, l, and m are all positive integers.

After determining the grid cube corresponding to the coordinates of the laser point data in the world coordinate system, related information of the grid cube corresponding to the coordinates of the laser point data in the world coordinate system, for example, a cube type, can be acquired.

Finally, if the acquired cube type of the grid cube is a static cube, the laser point data is determined as static laser point data used to characterize a static obstacle. Therefore, the laser point data can be identified.

In some optional implementations of the present embodiment, if the acquired cube type of the grid cube is a dynamic cube, the laser point data can be determined as dynamic laser point data used to characterize a dynamic obstacle.

Through the operation of step 203, for each laser point data in the acquired latest frame of laser point cloud data, whether the laser point data is static laser point data has been identified, thus providing a basis for subsequent further processing of the laser point cloud data and improving the accuracy of subsequent obstacle identification of the laser point cloud data. For example, when certain laser point data has been determined as a static laser point in step 203, the laser point data will not be subsequently used to identify whether the laser point data is laser point data characterizing movable objects such as pedestrians or vehicles, but the laser point data can be subsequently used to identify whether the laser point data is laser point data characterizing immovable objects such as lane lines, lanes, traffic lights, or intersections.

According to the method provided by the above embodiment of the present disclosure, by: acquiring current pose information of the autonomous vehicle in the world coordinate when a latest frame of laser point cloud data collected by the lidar is received, acquiring N×N map blocks which are pre-loaded into a cache and are centered on a map block corresponding to the current pose information in a preset three-dimensional grid map from the cache according to the current pose information, and executing laser point data identification operations for each laser point data in the received laser point cloud data, thereby whether each laser point data is a static laser point can be identified. The method provides a basis for subsequent analysis and processing of the laser point data by the autonomous vehicle, and may improve the accuracy of laser point data obstacle identification.

Figure 4:
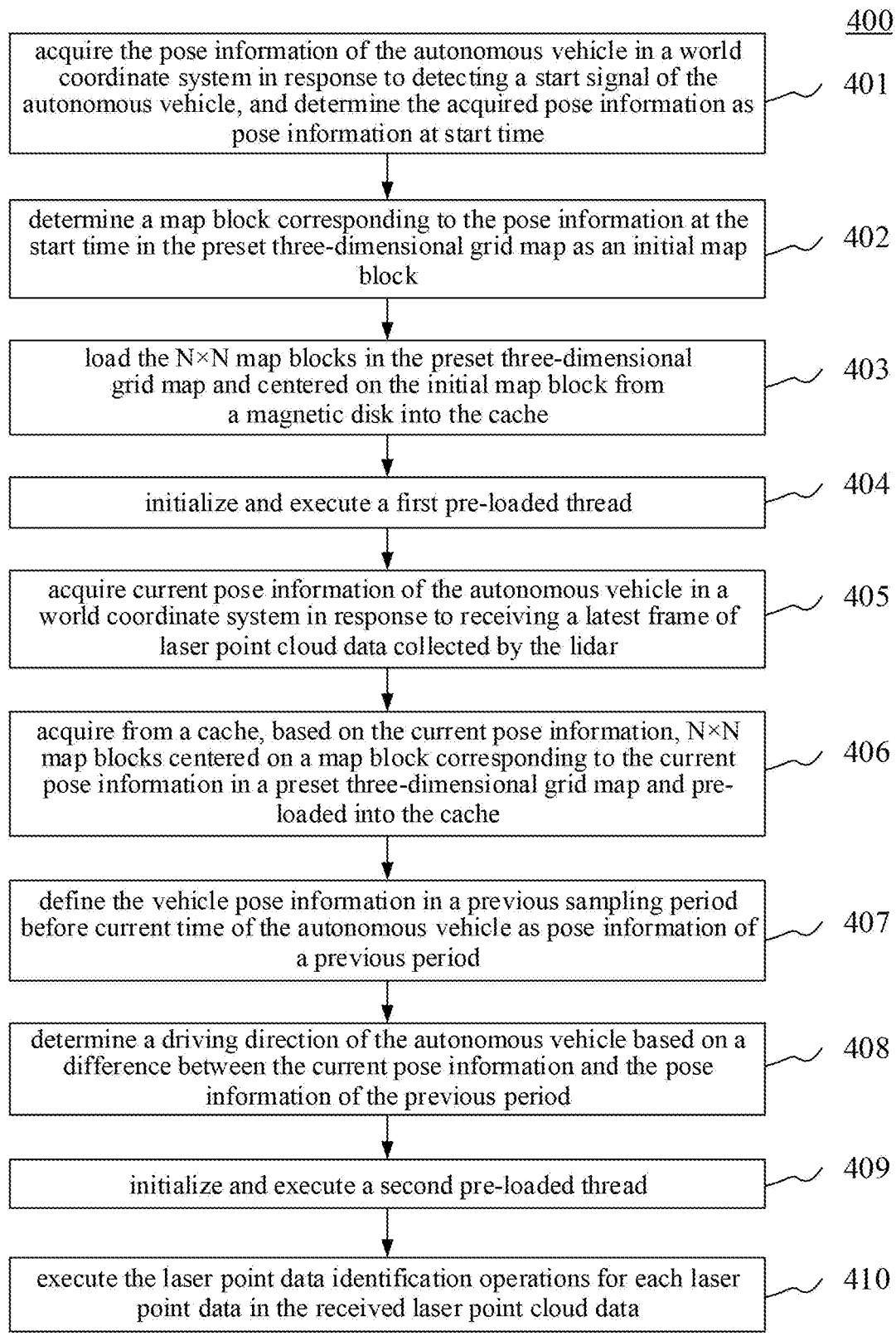
FIG. 4 shows a flow chart of the method for identifying laser point cloud data of an autonomous vehicle according to another embodiment the present disclosure.

Further referring to FIG. 4, which shows a flow 400 of the method for identifying laser point cloud data of an autonomous vehicle according to another embodiment. The flow 400 of the method for identifying laser point cloud data of an autonomous vehicle includes:

step 401, acquiring the pose information of the autonomous vehicle in a world coordinate system in response to detecting a start signal of the autonomous vehicle, and define the acquired pose information as pose information at start time.

In the present embodiment, an electronic device (e.g., the driving control device shown in FIG. 1) on which the method for identifying the laser point cloud data of the autonomous vehicle runs can acquire the pose information of the autonomous vehicle in the world coordinate system (e.g., an UTM world coordinate system) after detecting a start signal of the autonomous vehicle, and determine the acquired pose information as pose information at the start time. Here, the start signal of the autonomous vehicle may be a preset electrical signal, for example, the start signal may be a KL15 signal, a KL30 signal, a KL50 signal, a KL61 signal, or the like.

Here, the electronic device can acquire the pose information of the autonomous vehicle in the world coordinate system through a hardware structure mounted on the autonomous vehicle and capable of providing a positioning function. Since the vehicle pose information acquired here is pose information at the start time of the vehicle, the acquired pose information can be determined as pose information at the start time.

Here, the pose information of the autonomous vehicle in the world coordinate system may include location information and posture information, the location information may include three-dimensional coordinates (e.g., latitude and longitude, and height), and the posture information may include a pitch angle, a yaw angle, or a roll angle.

Step 402, defining a map block corresponding to the pose information at the start time in the preset three-dimensional grid map as an initial map block.

In the present embodiment, the preset three-dimensional grid map may be stored in a magnetic disk of the electronic device. Here, the preset three-dimensional grid map divides the earth surface into R rows and C columns of square map blocks according to the world coordinate system, each map block is divided into M×M square map grids, each map grid includes at least one grid cube, and each grid cube includes a cube type indicating that the grid cube is a static cube characterizing a static obstacle or is a dynamic cube characterizing a dynamic obstacle.

In the present embodiment, according to the location information (i.e., coordinates of the autonomous vehicle in the world coordinate system when started), the coordinates of the upper left corner of the preset three-dimensional grid map, and the side length of the map block of the preset three-dimensional grid map, the electronic device can first determine in which map block the coordinates of the autonomous vehicle are in the world coordinate system at start time, i.e., a map block corresponding to the pose information at the start time in the preset three-dimensional grid map is determined. Then, the electronic device can determine the map block corresponding to the pose information at the start time in the preset three-dimensional grid map as an initial map block.

Step 403, loading the N×N map blocks in the preset three-dimensional grid map and centered on the initial map block from a magnetic disk into the cache.

In the present embodiment, the electronic device can load the N×N map blocks which are in the preset three-dimensional grid map and centered on the initial map block from the magnetic disk into the cache. Here, since the initial map block has been determined, the N×N map blocks centered on the initial map block can be determined according to the initial map block. As an example, if the initial map block can be represented as (i, j), wherein i represents the row number of the initial map block in the preset three-dimensional grid map, and j represents the column number of the initial map block in the preset three-dimensional grid map, the 3×3 map blocks centered on the initial map block can be respectively represented as follows: (i−1, j−1), (i, j−1), (i+1, j−1), (i−1, j), (i, j), (i+1, j), (i−1, j+1), (i, j+1), and (i+1, j+1).

Step 404, initializing and executing a first pre-loaded thread.

In the present embodiment, the electronic device can initialize and execute a first pre-loaded thread. The first pre-loaded thread is used for loading (4N+4) map blocks which have not been loaded into the cache into the cache from the magnetic disk, the (4N+4) map blocks being in the (N+2)×(N+2) map blocks which are in the preset three-dimensional grid map and centered on the initial map block.

Figure 5A:
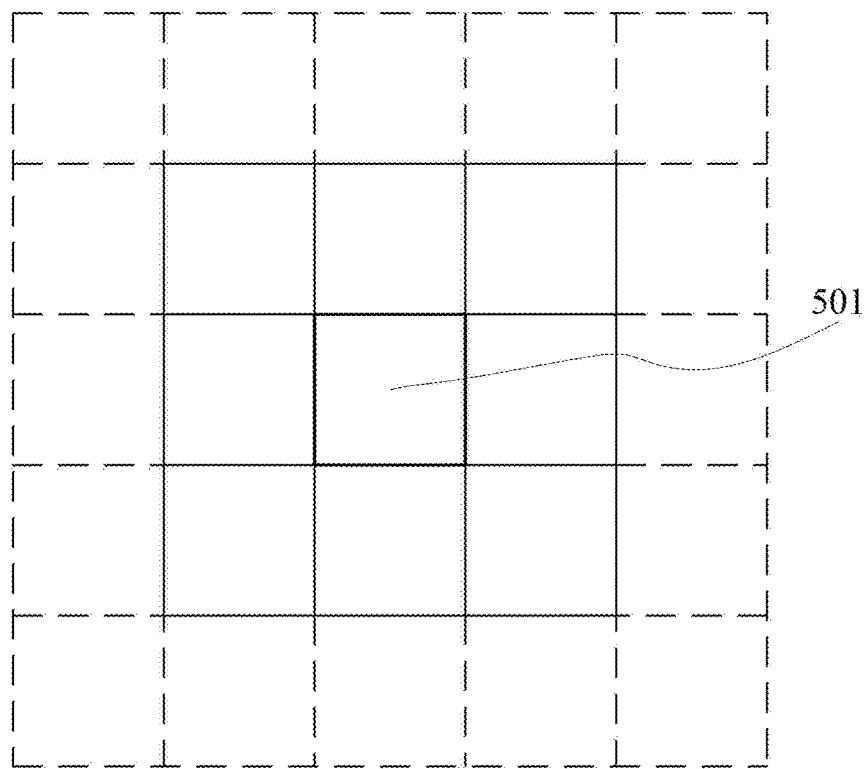
FIG. 5A is a schematic diagram of 16 not loaded map blocks at the periphery of the 3×3 map blocks loaded into the cache according to the present disclosure.
Figure 5B:
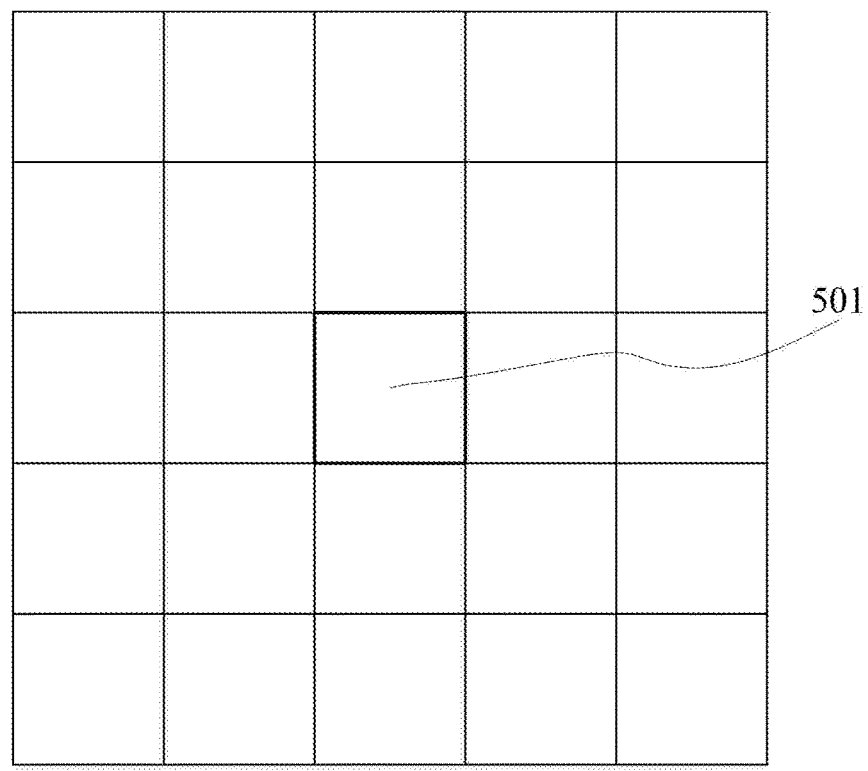
FIG. 5B is a schematic diagram of the 16 map blocks, at the periphery of the 3×3 map blocks loaded into the cache, being also loaded into the cache according to the present disclosure.

Referring to FIG. 5A, FIG. 5A shows that when N is 3, the 3×3 map blocks (as indicated by a solid line part in FIG. 5A) centered on the initial map block (as indicated by a reference numeral 501 in FIG. 5A) have been loaded into the cache in step 403, and a first pre-loaded thread is created and executed in step 404 to load the 16 map blocks (as indicated by a dashed line part in FIG. 5A) which are at the peripheral of the 3×3 map blocks loaded into the cache into the cache, and since a loading task is executed by the initialized thread, the execution of subsequent operations in the current thread are not affected. Referring to FIG. 5B, FIG. 5B shows an illustrative diagram of the 16 map blocks, which are at the periphery of the 3×3 map blocks loaded into the cache, being also loaded into the cache after the execution of the first pre-loaded thread.

Step 405, acquiring current pose information of the autonomous vehicle in a world coordinate system in response to receiving a latest frame of laser point cloud data collected by the lidar.

Step 406: acquiring from a cache, based on the current pose information, N×N map blocks centered on a map block corresponding to the current pose information in a preset three-dimensional grid map and pre-loaded into the cache.

In the present embodiment, the specific operations at step 405 and step 406 are basically the same as those at step 201 and step 202 in the embodiment shown in FIG. 2, and will not be repeated here.

Step 407, defining the vehicle pose information in a previous sampling period before current time of the autonomous vehicle as pose information of a previous period.

In the present embodiment, the electronic device (e.g., the driving control device shown in FIG. 1) on which the method for identifying the laser point cloud data of the autonomous vehicle runs may store vehicle pose information of each sampling period (e.g., 1 second) within a preset time period (e.g., 1 hour) before the current time, so that the electronic device may determine the vehicle pose information in the previous one sampling period of the current time of the autonomous vehicle as the previous one period pose information. Here, the vehicle pose information may be pose information based on the world coordinate system.

Step 408, determining a driving direction of the autonomous vehicle based on a difference between the current pose information and the pose information of the previous period.

In the present implementation, the electronic device can determine the driving direction of the autonomous vehicle according to the difference information between the current pose information of the autonomous vehicle and the previous one period pose information acquired in step 407.

Step 409, initializing and executing a second pre-loaded thread.

In the present embodiment, the electronic device can initialize and execute a second pre-loaded thread. The second pre-loaded thread is used for loading (N+2) map blocks adjacent to (N+2)×(N+2) map blocks along the determined driving direction in the preset three-dimensional grid map into the cache from the magnetic disk, the (N+2)×(N+2) map blocks being centered on a map block corresponding to the current pose information and having been loaded into the cache.

Figure 6A:
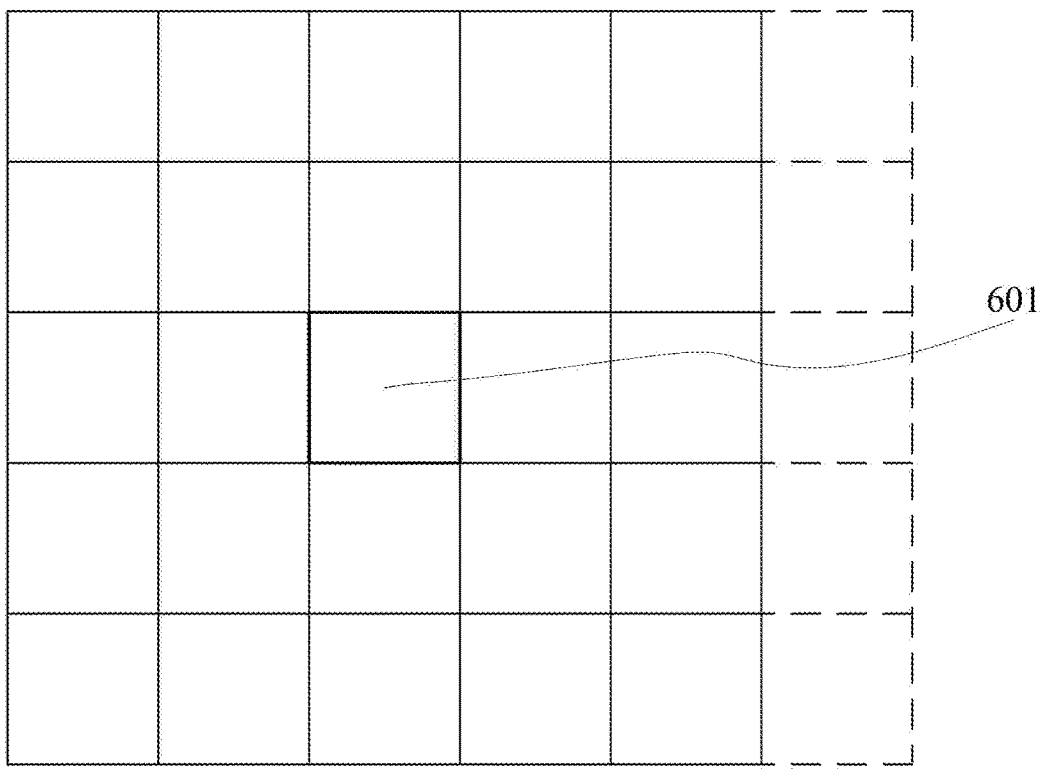
FIG. 6A is a schematic diagram of 5 map blocks not loaded into the cache and adjacent to 5×5 map blocks loaded into the cache according to the present disclosure.
Figure 6B:
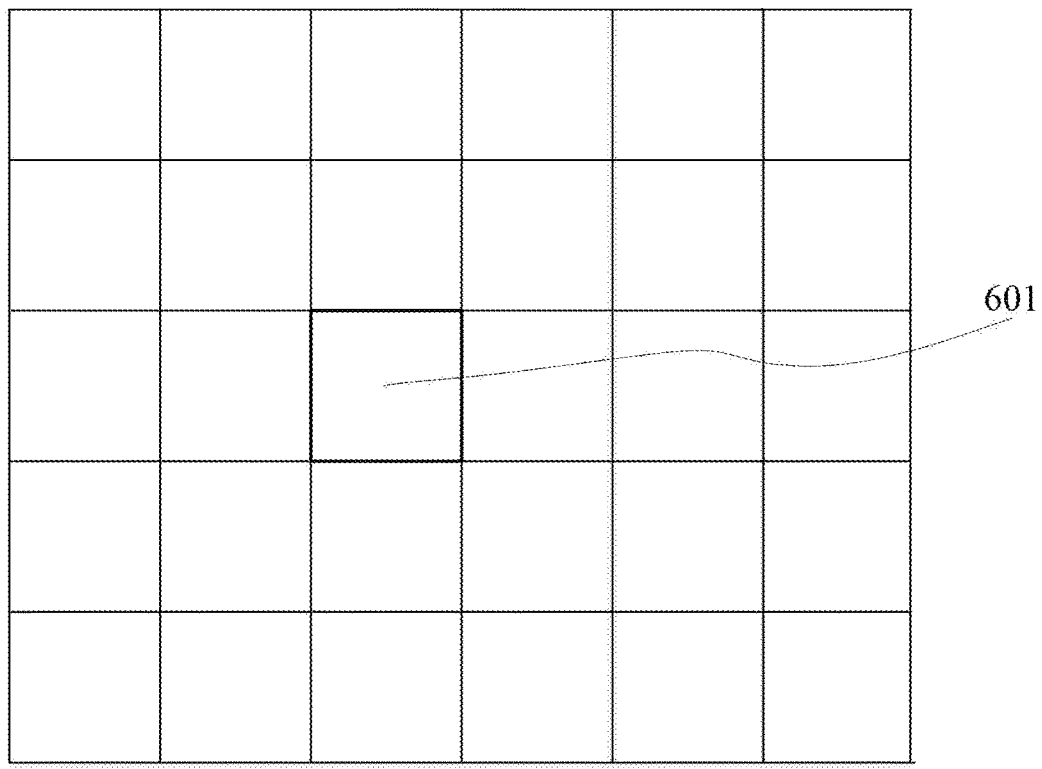
FIG. 6B is a schematic diagram of the 5 map blocks, adjacent to the 5×5 map blocks loaded into the cache, being also loaded into the cache according to the present disclosure.

Referring to FIG. 6A, FIG. 6A shows that when N is 3, 5×5 map blocks (as shown by a solid line part in FIG. 6A) centered on the map block (as shown by the reference numeral 601 in FIG. 6A) corresponding to the current pose information have been loaded into the cache, and the driving direction of the autonomous vehicle is determined as a direction indicated by a right map block, so that a second pre-loaded thread can be initialized and executed to load 5 map blocks (as shown by a dashed line part in FIG. 6A) in the preset three-dimensional grid map adjacent to the 5×5 map blocks which have been loaded into the cache and are centered on the map block corresponding to the current pose information along the rightward direction into the cache. Referring to FIG. 6B, the FIG. 6B shows that after the execution of the second pre-loaded thread, the 5 map blocks in the preset three-dimensional grid map which are adjacent to the 5×5 map blocks along the rightward direction are also loaded into the cache, the 5×5 map blocks having been loaded into the cache and being centered on the map block corresponding to the current pose information.

Step 410: executing the laser point data identification operations for each laser point data in the received laser point cloud data.

In the present embodiment, the specific operations of step 410 are basically the same as those of step 203 in the embodiment shown in FIG. 2, and will not be repeated here.

As can be seen from FIG. 4, compared with the corresponding embodiment of FIG. 2, the flow 400 of the method for identifying the laser point cloud data of the autonomous vehicle in the present embodiment additionally includes the steps of: loading, at the start time of the vehicle, the N×N map blocks centered on the map block corresponding to the pose information at the start time of the vehicle in the preset three-dimensional grid map into the cache; initializing and executing a first pre-loaded thread; determining the driving direction of the autonomous vehicle; and initializing and executing a second pre-loaded thread. Thus, according to the scheme described in the present embodiment, a required map block can be loaded into the cache in advance, so that the processing speed of laser point data obstacle identification can be increased, and then the safety of the autonomous vehicle can be greatly improved.

Figure 7A:
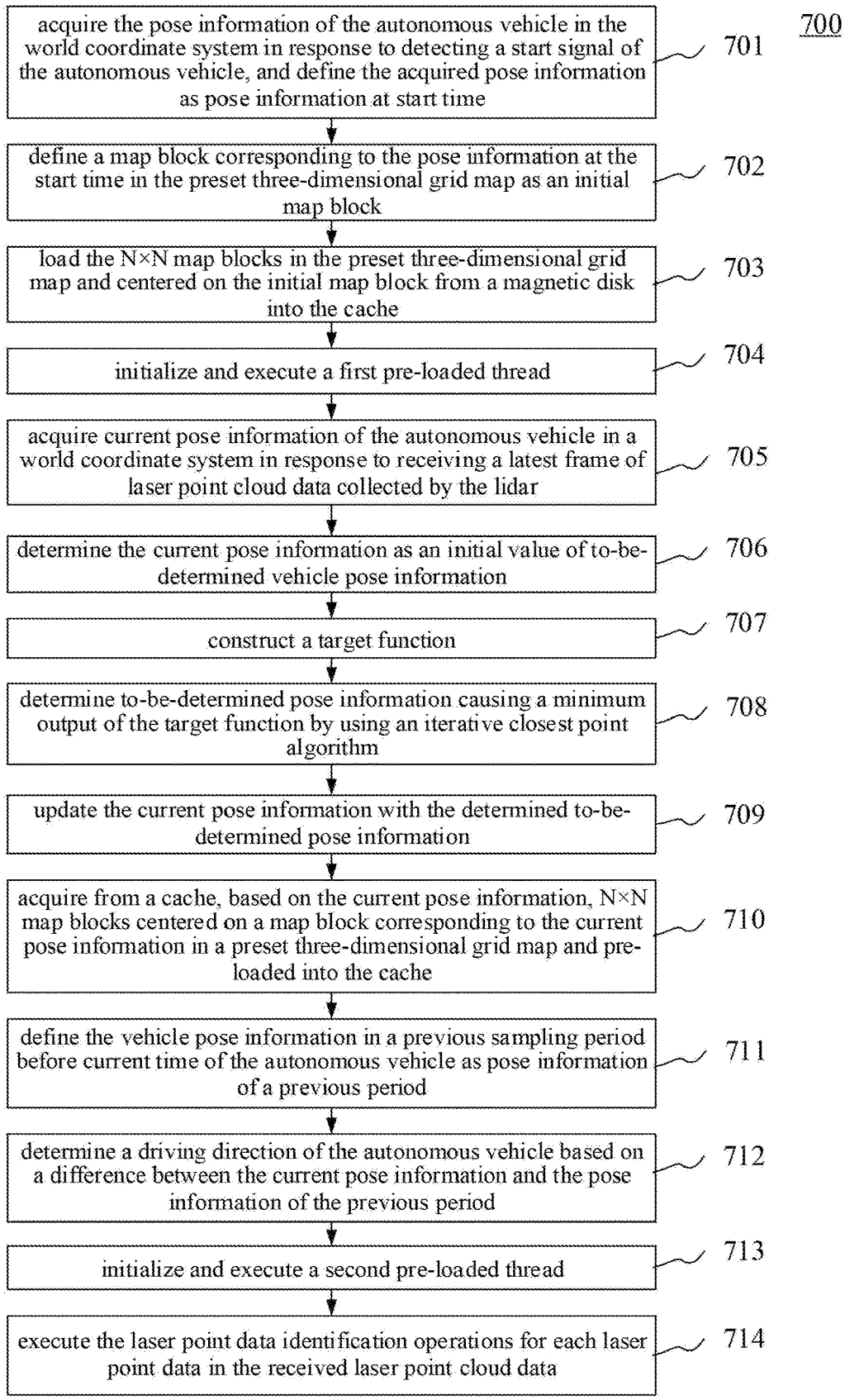
FIG. 7A shows a flow chart of the method for identifying laser point cloud data of an autonomous vehicle according to another embodiment of the present disclosure.

Continue to refer to FIG. 7A, it shows a flow 700 of the method for identifying laser point cloud data of an autonomous vehicle according to another embodiment. The flow 700 of the method for identifying laser point cloud data of an autonomous vehicle includes:

Step 701, acquiring the pose information of the autonomous vehicle in the world coordinate system in response to detecting a start signal of the autonomous vehicle, and define the acquired pose information as pose information at start time.

Step 702, defining a map block corresponding to the pose information at the start time in the preset three-dimensional grid map as an initial map block.

Step 703, loading the N×N map blocks in the preset three-dimensional grid map and centered on the initial map block from a magnetic disk into the cache.

Step 704: initializing and executing a first pre-loaded thread.

Step 705, acquiring current pose information of the autonomous vehicle in a world coordinate system in response to receiving a latest frame of laser point cloud data collected by the lidar.

In the present embodiment, the specific operations of step 701 to step 705 are basically the same as those of step 401 to step 405 in the embodiment shown in FIG. 4, and will not be repeated here.

Step 706, determining the current pose information as an initial value of to-be-determined vehicle pose information.

Step 707, constructing a target function.

Figure 7B:
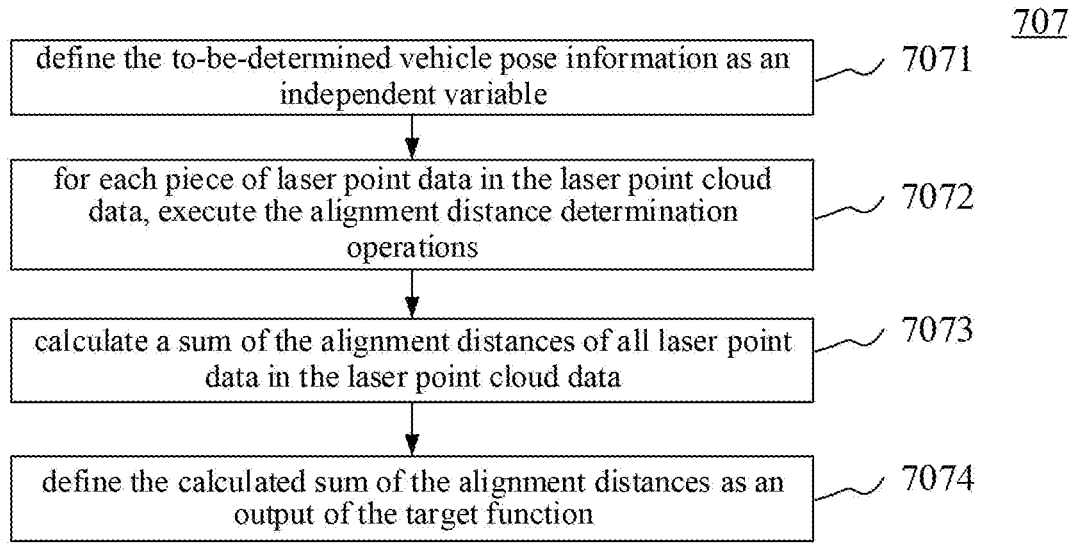
FIG. 7B is an decomposed flow chart in FIG. 7A according to the present disclosure.

In the present embodiment, the electronic device (e.g., the driving control device shown in FIG. 1) on which the method for identifying laser point cloud data of an autonomous vehicle runs can construct a target function according to the following steps 7071-7074. Referring to FIG. 7B, FIG. 7B is an decomposed flow diagram of an implementation of step 707.

Step 7071, defining the to-be-determined vehicle pose information as an independent variable.

Step 7072, for each piece of laser point data in the laser point cloud data, executing the alignment distance determination operations.

Figure 7C:
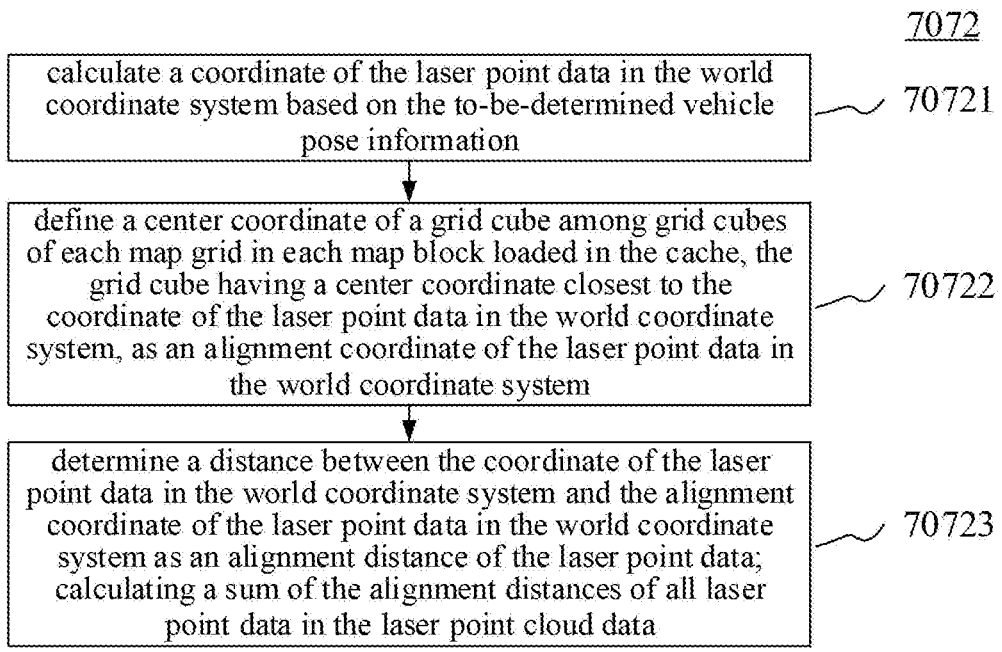
FIG. 7C is an decomposed flow chart of an implementation of an alignment distance determination operation according to the present disclosure.

Referring to FIG. 7C, FIG. 7C shows an decomposed flow diagram of an implementation of the alignment distance determination operation, including steps 70721-70723:

Step 70721, calculating a coordinate of the laser point data in the world coordinate system based on the to-be-determined vehicle pose information.

Here, a translation matrix can be obtained according to the location information in the to-be-determined vehicle pose information and a rotation matrix can be obtained according to the posture information in the to-be-determined vehicle pose information. Then, three-dimensional coordinates in the laser point data can be converted according to the rotation matrix and translation matrix to obtain the coordinates of the laser point data in the world coordinate system. It should be noted that how to obtain the translation matrix according to the location information in the to-be-determined vehicle pose information, how to obtain the rotation matrix according to the posture information in the to-be-determined vehicle pose information, and how to convert the three-dimensional coordinates in the laser point data according to the rotation matrix and the translation matrix so as to obtain the coordinates of the laser point data in the world coordinate system are existing technologies that are widely researched and applied at present and will not be described here.

Step 70722, defining a center coordinate of a grid cube among grid cubes of each map grid in each map block loaded in the cache, the grid cube having a center coordinate closest to the coordinate of the laser point data in the world coordinate system, as an alignment coordinate of the laser point data in the world coordinate system.

In some optional implementations of the present embodiment, step 70722 can be carried out as follows:

First, determining, in grid cubes of each map grid of each map block loaded in the cache, at least one grid cube having a distance between the center coordinate and the coordinate of the laser point data in the world coordinate system being less than or equal to a preset distance threshold.

Then, determining the center coordinate of the grid cube having the center coordinate having closest distance to the coordinate of the laser point data in the world coordinate system, in the determined at least one grid cube as an alignment coordinate of the laser point data in the world coordinate system. In this way, the calculation range can be reduced and the calculated amount can be reduced.

It should be noted that in the present embodiment, each grid cube of each map grid of each map block in the preset three-dimensional grid map further includes the center coordinates of the grid cube in the world coordinate system, that is, the geometric center coordinates of the grid cube in the world coordinate system.

Step 70723, determining a distance between the coordinate of the laser point data in the world coordinate system and the alignment coordinate of the laser point data in the world coordinate system as an alignment distance of the laser point data; calculating a sum of the alignment distances of all laser point data in the laser point cloud data.

Step 7073, calculating a sum of the alignment distances of all laser point data in the laser point cloud data.

Step 7074, defining the calculated sum of the alignment distances as an output of the target function.

In some optional implementations of the present embodiment, step 7072 can be carried out as follows:

First, down-sampling the received laser point cloud data to obtain down-sampled laser point cloud data.

Then, executing alignment distance determining operations for each laser point data in the down-sampled laser point cloud data.

Thus, step 7073 may be calculating the sum of the alignment distances of all laser point data in the down-sampled laser point cloud data.

Although the amount of data in the received laser point cloud data is great, step 7072 may implement the calculation of the sum of the alignment distances without a large amount of data. By adopting the above implementation, the alignment effect may not be reduced while the amount of calculation being cut down, and calculation time is saved.

Step 708, determining to-be-determined pose information causing a minimum target function output by using an iterative closest point algorithm.

In the present embodiment, the electronic device can use an iterative closest point (ICP) algorithm to determine the corresponding to-be-determined pose information when the output of the object function is minimum.

Step 709, updating the current pose information with the determined to-be-determined pose information.

Since there may be errors in the vehicle current pose information acquired in step 701, through the alignment operations from step 706 to step 709, the vehicle current pose information is updated using the received laser point cloud data to obtain the aligned current pose information, which can cause the subsequent calculation more accurate by using the aligned current pose information.

Step 710: acquiring from the cache, based on the current pose information, N×N map blocks centered on a map block corresponding to the current pose information in a preset three-dimensional grid map and pre-loaded into the cache.

Step 711, defining the vehicle pose information in a previous sampling period before current time of the autonomous vehicle as pose information of a previous period.

Step 712, determining a driving direction of the autonomous vehicle based on a difference between the current pose information and the pose information of the previous period Step 713: initializing and executing a second pre-loaded thread.

Step 714: for each laser point data in the received laser point cloud data, executing laser point data identification operations.

In the present embodiment, the specific operations of step 710 to step 714 are basically the same as those of step 406 to step 410 in the embodiment shown in FIG. 4, and will not be repeated here.

As can be seen from FIG. 7, compared with the corresponding embodiment of FIG. 4, the flow 700 of the method for identifying the laser point cloud data of the autonomous vehicle in the present embodiment additionally includes a step of aligning the current pose information of the autonomous vehicle. Thus, the scheme described in the present embodiment can further improve the accuracy of laser point data obstacle identification.

Figure 8:
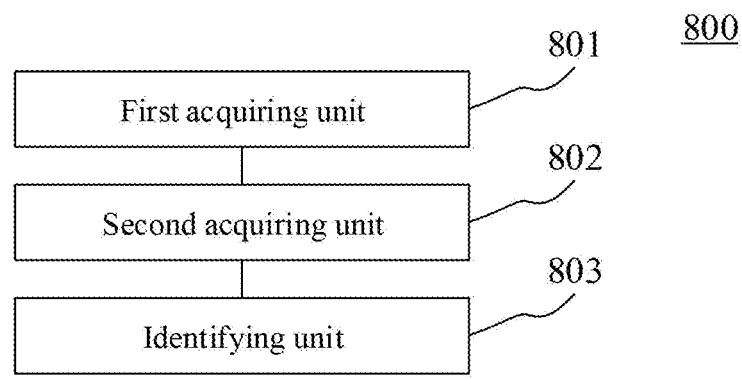
FIG. 8 shows a structural diagram of the apparatus for identifying laser point cloud data of an autonomous vehicle according to an embodiment of the present disclosure.

Further referring to FIG. 8, as the implementation of the method shown in the above figures, the present disclosure provides an embodiment of an apparatus for identifying laser point cloud data of an autonomous vehicle which is provided with a lidar, the embodiment of the apparatus corresponds to the embodiment of the method shown in FIG. 2, and the apparatus can be specifically applied to various types of electronic devices.

As shown in FIG. 8, the apparatus 800 for identifying the laser point cloud data of the unmanned vehicle in the present embodiment includes a first acquiring unit 801, a second acquiring unit 802, and an identifying unit 803. The first acquiring unit 801 is configured for acquiring current pose information of the autonomous vehicle in a world coordinate system in response to receiving a latest frame of laser point cloud data collected by the lidar; the second acquiring unit 802 is configured for acquiring from a cache, based on the current pose information, N×N map blocks centered on a map block corresponding to the current pose information in a preset three-dimensional grid map and pre-loaded into the cache, N being an odd number, the preset three-dimensional grid map dividing an earth surface into R rows and C columns of square map blocks according to the world coordinate system, each map block divided into M×M square map grids, each map grid comprising at least one grid cube, and each grid cube comprising a cube type indicating the grid cube being a static cube characterizing a static obstacle or a dynamic cube characterizing a dynamic obstacle; and the identifying unit 803 is configured for executing, for each laser point data in the received laser point cloud data, following laser point data identification operations: determining coordinate of the laser point data in the world coordinate system based on the current pose information; acquiring, from the acquired N×N map blocks, a grid cube corresponding to the coordinate of the laser point data in the world coordinate system; and defining the laser point data as static laser point data characterizing a static obstacle in response to the cube type of the acquired grid cube being a static cube.

In the present embodiment, specific processing of and technical effects brought by the first acquiring unit 801, the second acquiring unit 802 and the identifying unit 803 of the apparatus 800 for identifying the laser point cloud data of the autonomous vehicle can refer to related descriptions of step 201, step 202 and step 203 of the corresponding embodiment in FIG. 2 respectively, and will not be repeated herein.

In some optional implementations of the present embodiment, the laser point data identification operations further include: defining the laser point data as dynamic laser point data characterizing a dynamic obstacle in response to the cube type of the acquired grid cube being a dynamic cube.

In some optional implementations of the present embodiment, the apparatus 800 may further include: a first determining unit (not shown), for acquiring the pose information of the autonomous vehicle in the world coordinate system in response to detecting a start signal of the autonomous vehicle, and defining the acquired pose information as pose information at start time; a second determining unit (not shown), for defining a map block corresponding to the pose information at the start time in the preset three-dimensional grid map as an initial map block; a loading unit (not shown), for loading the N×N map blocks in the preset three-dimensional grid map and centered on the initial map block from a magnetic disk into the cache; and a first pre-loading unit (not shown), for initializing and executing a first pre-loaded thread, wherein the first pre-loaded thread is used for initializing and executing a first pre-loaded thread, wherein the first pre-loaded thread is used for loading (4N+4) map blocks not loaded in the cache, in(N+2)×(N+2) map blocks centered on the initial map block in the preset three-dimensional grid map, into the cache from the magnetic disk.

In some optional implementations of the present embodiment, the apparatus 800 may further include: for defining the pose information of the autonomous vehicle in a previous sampling period before current time as pose information of a previous period; a fourth determining unit, for determining a driving direction of the autonomous vehicle based on a difference between the current pose information and the pose information of the previous period; and a second pre-loading unit, for initializing and executing a second pre-loaded thread, wherein the second pre-loaded thread is used for loading (N+2) map blocks adjacent to the (N+2)×(N+2) map blocks along the determined driving direction in the preset three-dimensional grid map into the cache from the magnetic disk, the (N+2)×(N+2) map blocks centered on a map block corresponding to the current pose information and loaded into the cache.

In some optional implementations of the present embodiment, the grid cube may further include a center coordinate of the grid cube in the world coordinate system; and the apparatus 800 may further include: a fifth determining unit, for defining the current pose information as an initial value of to-be-determined vehicle pose information; a constructing unit, for constructing a target function by: taking the to-be-determined vehicle pose information as an independent variable; for each piece of laser point data in the laser point cloud data, executing following alignment distance determination operations: calculating a coordinate of the laser point data in the world coordinate system based on the to-be-determined vehicle pose information; defining a center coordinate of a grid cube among grid cubes of each map grid in each map block loaded in the cache, the grid cube having a center coordinate closest to the coordinate of the laser point data in the world coordinate system, as an alignment coordinate of the laser point data in the world coordinate system; defining a distance between the coordinate of the laser point data in the world coordinate system and the alignment coordinate of the laser point data in the world coordinate system as an alignment distance of the laser point data; calculating a sum of the alignment distances of all laser point data in the laser point cloud data; and defining the calculated sum of the alignment distances as an output of the target function; a sixth determining unit (not shown), for determining to-be-determined pose information causing a minimum output of the target function by using an iterative closest point algorithm; and an updating unit (not shown), for updating the current pose information with the determined to-be-determined pose information.

In some optional implementations of the present embodiment, the executing the following alignment distance determining operations for each laser point data in the laser point cloud data may include: down-sampling the laser point cloud data to obtain down-sampled laser point cloud data; executing the alignment distance determination operations for each laser point data in the down-sampled laser point cloud data; and the calculating a sum of the alignment distances of all laser point data in the laser point cloud data, comprising: calculating a sum of the alignment distances of all laser point data in the down-sampled laser point cloud data.

In some optional implementations of the present embodiment, the defining a center coordinate of a grid cube among grid cubes of each map grid of each map block loaded in the cache, the grid cube having a center coordinate closest to the coordinate of the laser point data in the world coordinate system, as an alignment coordinate of the laser point data in the world coordinate system comprises: determining, in the grid cubes of the each map grid of the each map block loaded in the cache, at least one grid cube having a distance between the center coordinate and the coordinate of the laser point data in the world coordinate system being less than or equal to a preset distance threshold; and defining the center coordinate of the grid cube having the center coordinate closest to the coordinate of the laser point data in the world coordinate system in the determined at least one grid cube as an alignment coordinate of the laser point data in the world coordinate system.

In some optional implementations of the present embodiment, the preset three-dimensional grid map is obtained by the following steps: acquiring a laser point cloud data frame sequence collected by a map collecting vehicle, each frame of laser point cloud data in the laser point cloud data frame sequence being marked with corresponding current vehicle pose information; for the each frame of the laser point cloud data in the laser point cloud data frame sequence, converting each piece of laser point data in the frame of the laser point cloud data into a coordinate in the world coordinate system based on the current vehicle pose information corresponding to the marked frame of the laser point cloud data to obtain a converted laser point cloud frame sequence; splicing the each frame of the laser point cloud data in the converted laser point cloud data frame sequence to obtain spliced laser point cloud data, generating a three-dimensional map based on the spliced laser point cloud data, and presenting the three-dimensional map; in response to receiving a dynamic laser point labeling operation of a user on the three-dimensional map, acquiring a dynamic laser point labeled by the user, and deleting the acquired dynamic laser point from the spliced laser point cloud data to obtain static laser point cloud data; generating a preset three-dimensional grid map by: dividing an earth surface into R rows and C columns of square map blocks in the world coordinate system, dividing each map block into M×M square map grids, dividing each map grid into at least one grid cube with an edge length of each grid cube being the same as a side length of each map grid, and setting the cube type of each grid cube as a dynamic cube; and for each piece of static laser point data in the static laser point cloud data, setting the cube type of the grid cube corresponding to the coordinate of the static laser point data in the world coordinate system as the static cube in the preset three-dimensional grid map.

It should be noted that the implementation details and technical effects of units in the apparatus for identifying laser point cloud data of an autonomous vehicle, provided by the present embodiment, can refer to related descriptions of other embodiments in the present disclosure, and will not be repeated here.

Figure 9:
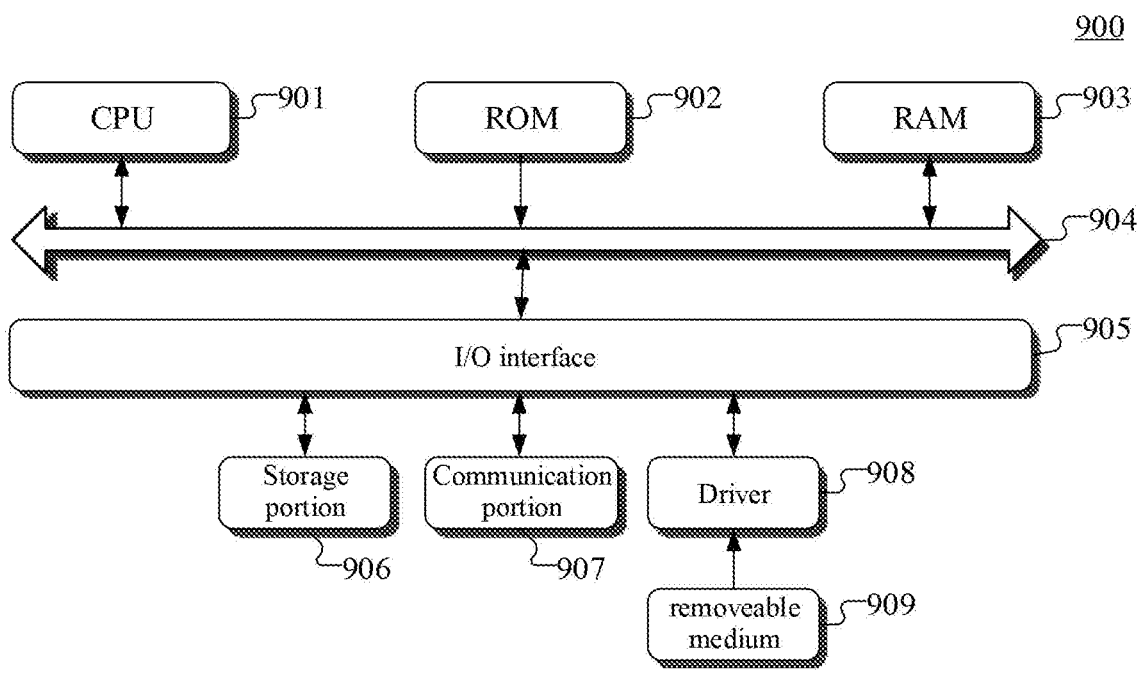
FIG. 9 is a structural diagram of a computer system of a driving control device suitable for implementing the embodiments of the present disclosure.

Referring to FIG. 9, a schematic structural diagram of a computer system 900 adapted to implement a driving control device of the embodiments of the present disclosure is shown. The driving control device is merely an example and should not bring any limitation to the function and usage range of the present disclosure.

As shown in FIG. 9, the computer system 900 includes a central processing unit (CPU) 901, which may execute various appropriate actions and processes in accordance with a program stored in a read-only memory (ROM) 902 or a program loaded into a random access memory (RAM) 903 from a storage portion 906. The RAM 903 also stores various programs and data required by operations of the system 900. The CPU 901, the ROM 902 and the RAM 903 are connected to each other through a bus 904. An input/output (I/O) interface 905 is also connected to the bus 904.

The following components are connected to the I/O interface 905: a storage portion 906 including a hard disk and the like; and a communication portion 907 comprising a network interface card, such as a LAN card and a modem. The communication portion 907 performs communication processes via a network, such as the Internet. A driver 908 is also connected to the I/O interface 905 as required. A removable medium 909, such as a magnetic disk, an optical disk, a magneto-optical disk, and a semiconductor memory, may be installed on the driver 908, to facilitate the retrieval of a computer program from the removable medium 909, and the installation thereof on the storage portion 906 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion X09, and/or may be installed from the removable media X11. The computer program, when executed by the central processing unit (CPU) X01, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a first acquiring unit, a second acquiring unit and an identification unit, where the names of these units or modules do not in some cases constitute a limitation to such units or modules themselves. For example, the first acquiring unit may also be described as "a unit for acquiring the vehicle current pose information."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire current pose information of the autonomous vehicle in a world coordinate system in response to receiving a latest frame of laser point cloud data collected by the lidar; acquire, according to the current pose information, N×N map blocks which are pre-loaded into a cache and are centered on a map block corresponding to the current pose information in a preset three-dimensional grid map from the cache, wherein N is an odd number, the preset three-dimensional grid map divides the earth surface into R rows and C columns of square map blocks according to the world coordinate system, each map block is divided into M×M square map grids, each map grid comprises at least one grid cube, and each grid cube comprises a cube type indicating that the grid cube is a static cube characterizing a static obstacle or is a dynamic cube characterizing a dynamic obstacle; and for each laser point data in the received laser point cloud data, executing following laser point data identification operations: determine coordinate of the laser point data in the world coordinate system according to the current pose information; acquire, from the acquired N×N map blocks, a grid cube corresponding to the coordinate of the laser point data in the world coordinate system; and determine the laser point data as static laser point data characterizing a static obstacle in response to the cube type of the acquired grid cube being a static cube.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for identifying laser point cloud data of an autonomous vehicle provided with a lidar, the method comprising:
   acquiring current pose information of the autonomous vehicle in a world coordinate system in response to receiving a latest frame of laser point cloud data collected by the lidar;
   acquiring from a cache, based on the current pose information, N×N map blocks centered on a map block corresponding to the current pose information in a preset three-dimensional grid map and pre-loaded into the cache, N being an odd number, the preset three-dimensional grid map dividing an earth surface into R rows and C columns of square map blocks according to the world coordinate system, each map block divided into M×M square map grids, each map grid comprising at least one grid cube, and each grid cube comprising a cube type indicating the grid cube being a static cube characterizing a static obstacle or a dynamic cube characterizing a dynamic obstacle; and
   executing, for each laser point data in the received laser point cloud data, following laser point data identification operations: determining coordinate of the laser point data in the world coordinate system based on the current pose information; acquiring, from the acquired N×N map blocks, a grid cube corresponding to the coordinate of the laser point data in the world coordinate system; and defining the laser point data as static laser point data characterizing a static obstacle in response to the cube type of the acquired grid cube being a static cube.

2. The method according to claim 1, wherein the laser point data identification operations further comprise: defining the laser point data as dynamic laser point data characterizing a dynamic obstacle in response to the cube type of the acquired grid cube being a dynamic cube.

3. The method according to claim 2, wherein before the acquiring current pose information of the autonomous vehicle in a world coordinate system in response to receiving a latest frame of the laser point cloud data collected by the lidar, the method further comprising:
   acquiring the pose information of the autonomous vehicle in the world coordinate system in response to detecting a start signal of the autonomous vehicle, and define the acquired pose information as pose information at start time;
   defining a map block corresponding to the pose information at the start time in the preset three-dimensional grid map as an initial map block;
   loading the N×N map blocks in the preset three-dimensional grid map and centered on the initial map block from a magnetic disk into the cache; and
   initializing and executing a first pre-loaded thread, wherein the first pre-loaded thread is used for loading (4N+4) map blocks not loaded in the cache, in (N+2)×(N+2) map blocks centered on the initial map block in the preset three-dimensional grid map, into the cache from the magnetic disk.

4. The method according to claim 3, wherein before the executing, for each laser point data in the received laser point cloud data, following laser point data identification operations, the method further comprising:
   defining the pose information of the autonomous vehicle in a previous sampling period before current time as pose information of a previous period;
   determining a driving direction of the autonomous vehicle based on a difference between the current pose information and the pose information of the previous period; and
   initializing and executing a second pre-loaded thread, wherein the second pre-loaded thread is used for loading (N+2) map blocks adjacent to the (N+2)×(N+2) map blocks along the determined driving direction in the preset three-dimensional grid map into the cache from the magnetic disk, the (N+2)×(N+2) map blocks centered on a map block corresponding to the current pose information and loaded into the cache.

5. The method according to claim 4, wherein the grid cube further comprises a center coordinate of the grid cube in the world coordinate system; and
   after the acquiring current pose information of the autonomous vehicle in the world coordinate system, the method further comprises:
   defining the current pose information as an initial value of to-be-determined vehicle pose information;
   constructing a target function by: taking the to-be-determined vehicle pose information as an independent variable; for each piece of laser point data in the laser point cloud data, executing following alignment distance determination operations: calculating a coordinate of the laser point data in the world coordinate system based on the to-be-determined vehicle pose information; defining a center coordinate of a grid cube among grid cubes of each map grid in each map block loaded in the cache, the grid cube having a center coordinate closest to the coordinate of the laser point data in the world coordinate system, as an alignment coordinate of the laser point data in the world coordinate system; defining a distance between the coordinate of the laser point data in the world coordinate system and the alignment coordinate of the laser point data in the world coordinate system as an alignment distance of the laser point data; calculating a sum of the alignment distances of all laser point data in the laser point cloud data; and defining the calculated sum of the alignment distances as an output of the target function;

determining to-be-determined pose information causing a minimum output of the target function by using an iterative closest point algorithm; and updating the current pose information with the determined to-be-determined pose information.

6. The method according to claim 5, wherein the for each laser point data in the laser point cloud data, executing following alignment distance determination operations comprises:

down-sampling the laser point cloud data to obtain down-sampled laser point cloud data;

executing the alignment distance determination operations for each laser point data in the down-sampled laser point cloud data; and the calculating a sum of the alignment distances of all laser point data in the laser point cloud data, comprising:

calculating a sum of the alignment distances of all laser point data in the down-sampled laser point cloud data.

7. The method according to claim 6, wherein the defining a center coordinate of a grid cube among grid cubes of each map grid of each map block loaded in the cache, the grid cube having a center coordinate closest to the coordinate of the laser point data in the world coordinate system, as an alignment coordinate of the laser point data in the world coordinate system comprises:

determining, in the grid cubes of the each map grid of the each map block loaded in the cache, at least one grid cube having a distance between the center coordinate and the coordinate of the laser point data in the world coordinate system being less than or equal to a preset distance threshold; and defining the center coordinate of the grid cube having the center coordinate closest to the coordinate of the laser point data in the world coordinate system in the determined at least one grid cube as an alignment coordinate of the laser point data in the world coordinate system.

8. The method according to claim 1, wherein the preset three-dimensional grid map is obtained by:

acquiring a laser point cloud data frame sequence collected by a map collecting vehicle, each frame of laser point cloud data in the laser point cloud data frame sequence being marked with corresponding current vehicle pose information;

for the each frame of the laser point cloud data in the laser point cloud data frame sequence, converting each piece of laser point data in the frame of the laser point cloud data into a coordinate in the world coordinate system based on the current vehicle pose information corresponding to the marked frame of the laser point cloud data to obtain a converted laser point cloud frame sequence;

splicing the each frame of the laser point cloud data in the converted laser point cloud data frame sequence to obtain spliced laser point cloud data, generating a three-dimensional map based on the spliced laser point cloud data, and presenting the three-dimensional map;

in response to receiving a dynamic laser point labeling operation of a user on the three-dimensional map, acquiring a dynamic laser point labeled by the user, and deleting the acquired dynamic laser point from the spliced laser point cloud data to obtain static laser point cloud data;

generating a preset three-dimensional grid map by: dividing an earth surface into R rows and C columns of square map blocks in the world coordinate system, dividing each map block into M×M square map grids, dividing each map grid into at least one grid cube with an edge length of each grid cube being the same as a side length of each map grid, and setting the cube type of each grid cube as a dynamic cube; and for each piece of static laser point data in the static laser point cloud data, setting the cube type of the grid cube corresponding to the coordinate of the static laser point data in the world coordinate system as the static cube in the preset three-dimensional grid map.

9. An apparatus for identifying laser point cloud data of an autonomous vehicle provided with a lidar, the apparatus comprising:

at least one processor; and a memory storing instructions, the instructions when executed by the at least one processor, cause the at least one processor to perform operations, the operations comprising:

acquiring current pose information of the autonomous vehicle in a world coordinate system in response to receiving a latest frame of laser point cloud data collected by the lidar;

acquiring from a cache, based on the current pose information, N×N map blocks centered on a map block corresponding to the current pose information in a preset three-dimensional grid map and pre-loaded into the cache, N being an odd number, the preset three-dimensional grid map dividing an earth surface into R rows and C columns of square map blocks according to the world coordinate system, each map block divided into M×M square map grids, each map grid comprising at least one grid cube, and each grid cube comprising a cube type indicating the grid cube being a static cube characterizing a static obstacle or a dynamic cube characterizing a dynamic obstacle; and executing, for each laser point data in the received laser point cloud data, following laser point data identification operations: determining coordinate of the laser point data in the world coordinate system based on the current pose information; acquiring, from the acquired N×N map blocks, a grid cube corresponding to the coordinate of the laser point data in the world coordinate system; and defining the laser point data as static laser point data characterizing a static obstacle in response to the cube type of the acquired grid cube being a static cube.

10. The apparatus according to claim 9, wherein the laser point data identification operations further comprise: defining the laser point data as dynamic laser point data characterizing a dynamic obstacle in response to the cube type of the acquired grid cube being a dynamic cube.

11. The apparatus according to claim 10, wherein the operations further comprise:

acquiring the pose information of the autonomous vehicle in the world coordinate system in response to detecting a start signal of the autonomous vehicle, and define the acquired pose information as pose information at start time;

defining a map block corresponding to the pose information at the start time in the preset three-dimensional grid map as an initial map block;

loading the N×N map blocks in the preset three-dimensional grid map and centered on the initial map block from a magnetic disk into the cache; and initializing and executing a first pre-loaded thread, wherein the first pre-loaded thread is used for loading (4N+4) map blocks not loaded in the cache, in(N+2)×(N+2) map blocks centered on the initial map block in the preset three-dimensional grid map, into the cache from the magnetic disk.

12. The apparatus according to claim 11, wherein the operations further comprise:

defining the pose information of the autonomous vehicle in a previous sampling period before current time as pose information of a previous period;

determining a driving direction of the autonomous vehicle based on a difference between the current pose information and the pose information of the previous period; and initializing and executing a second pre-loaded thread, wherein the second pre-loaded thread is used for loading (N+2) map blocks adjacent to the (N+2)×(N+2) map blocks along the determined driving direction in the preset three-dimensional grid map into the cache from the magnetic disk, the (N+2)×(N+2) map blocks centered on a map block corresponding to the current pose information and loaded into the cache.

13. The apparatus according to claim 12, wherein the grid cube further comprises a center coordinate of the grid cube in the world coordinate system; and the operations further comprises:

defining the current pose information as an initial value of to-be-determined vehicle pose information;

constructing a target function by: taking the to-be-determined vehicle pose information as an independent variable; for each piece of laser point data in the laser point cloud data, executing following alignment distance determination operations: calculating a coordinate of the laser point data in the world coordinate system based on the to-be-determined vehicle pose information; defining a center coordinate of a grid cube among grid cubes of each map grid in each map block loaded in the cache, the grid cube having a center coordinate closest to the coordinate of the laser point data in the world coordinate system, as an alignment coordinate of the laser point data in the world coordinate system; defining a distance between the coordinate of the laser point data in the world coordinate system and the alignment coordinate of the laser point data in the world coordinate system as an alignment distance of the laser point data; calculating a sum of the alignment distances of all laser point data in the laser point cloud data; and defining the calculated sum of the alignment distances as an output of the target function;

determining to-be-determined pose information causing a minimum output of the target function by using an iterative closest point algorithm; and updating the current pose information with the determined to-be-determined pose information.

14. The apparatus according to claim 13, wherein the for each laser point data in the laser point cloud data, executing following alignment distance determination operations comprises:

down-sampling the laser point cloud data to obtain down-sampled laser point cloud data;

executing the alignment distance determination operations for each laser point data in the down-sampled laser point cloud data; and the calculating a sum of the alignment distances of all laser point data in the laser point cloud data, comprising:

calculating a sum of the alignment distances of all laser point data in the down-sampled laser point cloud data.

15. The apparatus according to claim 14, wherein the defining a center coordinate of a grid cube among grid cubes of each map grid of each map block loaded in the cache, the grid cube having a center coordinate closest to the coordinate of the laser point data in the world coordinate system, as an alignment coordinate of the laser point data in the world coordinate system comprises:

determining, in the grid cubes of the each map grid of the each map block loaded in the cache, at least one grid cube having a distance between the center coordinate and the coordinate of the laser point data in the world coordinate system being less than or equal to a preset distance threshold; and defining the center coordinate of the grid cube having the center coordinate closest to the coordinate of the laser point data in the world coordinate system in the determined at least one grid cube as an alignment coordinate of the laser point data in the world coordinate system.

16. The apparatus according to claim 9, wherein the preset three-dimensional grid map is obtained by:

acquiring a laser point cloud data frame sequence collected by a map collecting vehicle, each frame of laser point cloud data in the laser point cloud data frame sequence being marked with corresponding current vehicle pose information;

for the each frame of the laser point cloud data in the laser point cloud data frame sequence, converting each piece of laser point data in the frame of the laser point cloud data into a coordinate in the world coordinate system based on the current vehicle pose information corresponding to the marked frame of the laser point cloud data to obtain a converted laser point cloud frame sequence;

splicing the each frame of the laser point cloud data in the converted laser point cloud data frame sequence to obtain spliced laser point cloud data, generating a three-dimensional map based on the spliced laser point cloud data, and presenting the three-dimensional map;

in response to receiving a dynamic laser point labeling operation of a user on the three-dimensional map, acquiring a dynamic laser point labeled by the user, and deleting the acquired dynamic laser point from the spliced laser point cloud data to obtain static laser point cloud data;

generating a preset three-dimensional grid map by: dividing an earth surface into R rows and C columns of square map blocks in the world coordinate system, dividing each map block into M×M square map grids, dividing each map grid into at least one grid cube with an edge length of each grid cube being the same as a side length of each map grid, and setting the cube type of each grid cube as a dynamic cube; and for each piece of static laser point data in the static laser point cloud data, setting the cube type of the grid cube corresponding to the coordinate of the static laser point data in the world coordinate system as the static cube in the preset three-dimensional grid map.

17. A non-transitory computer readable storage medium storing a computer program, wherein the computer program, when executed by a processor, cause the processor to perform operations, the operation comprising:
acquiring current pose information of the autonomous vehicle in a world coordinate system in response to receiving a latest frame of laser point cloud data collected by the lidar;
acquiring from a cache, based on the current pose information, N×N map blocks centered on a map block corresponding to the current pose information in a preset three-dimensional grid map and pre-loaded into the cache, N being an odd number, the preset three-dimensional grid map dividing an earth surface into R rows and C columns of square map blocks according to the world coordinate system, each map block divided into M×M square map grids, each map grid comprising at least one grid cube, and each grid cube comprising a cube type indicating the grid cube being a static cube characterizing a static obstacle or a dynamic cube characterizing a dynamic obstacle; and
executing, for each laser point data in the received laser point cloud data, following laser point data identification operations: determining coordinate of the laser point data in the world coordinate system based on the current pose information; acquiring, from the acquired N×N map blocks, a grid cube corresponding to the coordinate of the laser point data in the world coordinate system; and defining the laser point data as static laser point data characterizing a static obstacle in response to the cube type of the acquired grid cube being a static cube.

18. The method according to claim 3, wherein the preset three-dimensional grid map is obtained by:
acquiring a laser point cloud data frame sequence collected by a map collecting vehicle, each frame of laser point cloud data in the laser point cloud data frame sequence being marked with corresponding current vehicle pose information;
for the each frame of the laser point cloud data in the laser point cloud data frame sequence, converting each piece of laser point data in the frame of the laser point cloud data into a coordinate in the world coordinate system based on the current vehicle pose information corresponding to the marked frame of the laser point cloud data to obtain a converted laser point cloud frame sequence;
splicing the each frame of the laser point cloud data in the converted laser point cloud data frame sequence to obtain spliced laser point cloud data, generating a three-dimensional map based on the spliced laser point cloud data, and presenting the three-dimensional map;
in response to receiving a dynamic laser point labeling operation of a user on the three-dimensional map, acquiring a dynamic laser point labeled by the user, and deleting the acquired dynamic laser point from the spliced laser point cloud data to obtain static laser point cloud data;
generating a preset three-dimensional grid map by: dividing an earth surface into R rows and C columns of square map blocks in the world coordinate system, dividing each map block into M×M square map grids, dividing each map grid into at least one grid cube with an edge length of each grid cube being the same as a side length of each map grid, and setting the cube type of each grid cube as a dynamic cube; and
for each piece of static laser point data in the static laser point cloud data, setting the cube type of the grid cube corresponding to the coordinate of the static laser point data in the world coordinate system as the static cube in the preset three-dimensional grid map.

19. The method according to claim 18, wherein before the executing, for each laser point data in the received laser point cloud data, following laser point data identification operations, the method further comprising:
defining the pose information of the autonomous vehicle in a previous sampling period before current time as pose information of a previous period;
determining a driving direction of the autonomous vehicle based on a difference between the current pose information and the pose information of the previous period; and
initializing and executing a second pre-loaded thread, wherein the second pre-loaded thread is used for loading (N+2) map blocks adjacent to the (N+2)×(N+2) map blocks along the determined driving direction in the preset three-dimensional grid map into the cache from the magnetic disk, the (N+2)×(N+2) map blocks centered on a map block corresponding to the current pose information and loaded into the cache.

20. The apparatus according to claim 11, wherein the preset three-dimensional grid map is obtained by:
acquiring a laser point cloud data frame sequence collected by a map collecting vehicle, each frame of laser point cloud data in the laser point cloud data frame sequence being marked with corresponding current vehicle pose information;
for the each frame of the laser point cloud data in the laser point cloud data frame sequence, converting each piece of laser point data in the frame of the laser point cloud data into a coordinate in the world coordinate system based on the current vehicle pose information corresponding to the marked frame of the laser point cloud data to obtain a converted laser point cloud frame sequence;
splicing the each frame of the laser point cloud data in the converted laser point cloud data frame sequence to obtain spliced laser point cloud data, generating a three-dimensional map based on the spliced laser point cloud data, and presenting the three-dimensional map;
in response to receiving a dynamic laser point labeling operation of a user on the three-dimensional map, acquiring a dynamic laser point labeled by the user, and deleting the acquired dynamic laser point from the spliced laser point cloud data to obtain static laser point cloud data;
generating a preset three-dimensional grid map by: dividing an earth surface into R rows and C columns of square map blocks in the world coordinate system, dividing each map block into M×M square map grids, dividing each map grid into at least one grid cube with an edge length of each grid cube being the same as a side length of each map grid, and setting the cube type of each grid cube as a dynamic cube; and
for each piece of static laser point data in the static laser point cloud data, setting the cube type of the grid cube corresponding to the coordinate of the static laser point data in the world coordinate system as the static cube in the preset three-dimensional grid map.

\* \* \* \* \*